US011568449B2

(12) United States Patent
Oyama et al.

(10) Patent No.: US 11,568,449 B2
(45) Date of Patent: Jan. 31, 2023

(54) INFORMATION PROCESSOR AND SERVER CAPABLE OF DISPLAYING AN IMAGE WITH A REDISPLAY BUTTON

(71) Applicant: Universal Entertainment Corporation, Tokyo (JP)

(72) Inventors: Masaki Oyama, Tokyo (JP); Atsushi Kumita, Tokyo (JP); Toshikazu Jinnouchi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 198 days.

(21) Appl. No.: 16/144,824

(22) Filed: Sep. 27, 2018

(65) Prior Publication Data

US 2019/0102804 A1    Apr. 4, 2019

(30) Foreign Application Priority Data

Sep. 29, 2017 (JP) .............................. JP2017-191605

(51) Int. Cl.
*G06Q 30/00*    (2012.01)
*G06Q 30/02*    (2012.01)
*G07F 17/32*    (2006.01)

(52) U.S. Cl.
CPC ..... *G06Q 30/0271* (2013.01); *G07F 17/3213* (2013.01); *G07F 17/3288* (2013.01)

(58) Field of Classification Search
None
See application file for complete search history.

(56) References Cited

U.S. PATENT DOCUMENTS

| | | | |
|---|---|---|---|
| 8,342,399 B1* | 1/2013 | McGhie | G06Q 30/0228 235/380 |
| 2006/0063587 A1* | 3/2006 | Manzo | G07F 17/3227 463/25 |
| 2008/0189175 A1* | 8/2008 | Chan | G06Q 30/0218 705/14.2 |

(Continued)

OTHER PUBLICATIONS

Real Money Slots Online, Aug. 30, 2017, SlotsUP.com, printed through www.archive.org (Year: 2017).*

(Continued)

*Primary Examiner* — Naresh Vig
(74) *Attorney, Agent, or Firm* — Polsinelli PC

(57) ABSTRACT

A server comprises a storage unit for storing a plurality of image data, a first end input request image data including a redisplay setting image for setting whether to display the image on the information processor again or not and a first end request image for ending the display of the image, a second end input request image data including a second end request image for rejecting the redisplay of the image and ending the display of the image, and association data in which one of the first end input request image data and the second end input request image data is stored in association with the types of the plurality of image data, and a controller for executing a process of transmitting any one image data of the plurality of image data and either the first end input request image data or the second end input request image data associated based on the association data corresponding to the image data to the information processor.

9 Claims, 24 Drawing Sheets

(56) References Cited

U.S. PATENT DOCUMENTS

| | | | | |
|---|---|---|---|---|
| 2008/0215428 A1* | 9/2008 | Ramer | ............... | G06Q 30/0269 |
| | | | | 705/14.53 |
| 2010/0223130 A1* | 9/2010 | Broumand | ......... | G06Q 30/0258 |
| | | | | 705/14.56 |
| 2014/0106877 A1* | 4/2014 | Knutsson | .............. | A63F 13/537 |
| | | | | 463/31 |
| 2014/0358260 A1* | 12/2014 | Burgin | ................ | G07F 17/3239 |
| | | | | 700/91 |
| 2016/0225016 A1* | 8/2016 | Patel | ................. | G06Q 30/0245 |
| 2016/0232570 A1* | 8/2016 | Wilson | .................... | H04L 67/10 |
| 2017/0300969 A1* | 10/2017 | Malhotra | ................. | G09G 5/34 |
| 2018/0084079 A1* | 3/2018 | Williams | ................ | H04W 4/00 |
| 2018/0260844 A1* | 9/2018 | Goldstein | ............. | H04L 67/306 |

OTHER PUBLICATIONS

Nick Babich, UX Design: Checkbox and Toggle in Forms, Jun. 21, 2016, UX Planet (Year: 2016).*

Amy Ebersole, "From Netflix to Netflixed—Digital Television Production in the Post-TV Platinum Age of the Audience" (File name labeled as From Netflix to Netflixed), May 13, 2013, www.academia.edu (Year: 2013).*

Data Transmission, Dec. 1, 2013, Techopedia (Year: 2013).*

* cited by examiner

FIG.6

SYMBOL COLUMNS OF VIDEO REELS

|    | REEL 1     | REEL 2     | REEL 3     | REEL 4     | REEL 5     |
|----|------------|------------|------------|------------|------------|
| 0  | HEART      | 9          | CHERRY     | 9          | KING       |
| 1  | CHERRY     | JACK       | KING       | JACK       | ACE        |
| 2  | 7          | HEART      | 9          | WILD       | BELL       |
| 3  | JACK       | 7          | ACE        | 9          | KING       |
| 4  | KING       | 10         | BELL       | JACK       | WATERMELON |
| 5  | WATERMELON | 9          | 10         | HEART      | WATERMELON |
| 6  | 10         | ACE        | WATERMELON | KING       | QUEEN      |
| 7  | BELL       | BELL       | 10         | JACK       | HEART      |
| 8  | JACK       | JACK       | CHERRY     | 10         | JACK       |
| 9  | 9          | WATERMELON | 10         | BELL       | 9          |
| 10 | ACE        | 9          | WATERMELON | 9          | CHERRY     |
| 11 | JACK       | CHERRY     | JACK       | ACE        | 10         |
| 12 | ACE        | ACE        | KING       | ACE        | 7          |
| 13 | BELL       | QUEEN      | HEART      | 9          | ACE        |
| 14 | KING       | 9          | 7          | QUEEN      | JACK       |
| 15 | QUEEN      | KING       | 10         | 7          | 9          |
| 16 | HEART      | WILD       | 7          | CHERRY     | KING       |
| 17 | JACK       | ACE        | QUEEN      | HEART      | JACK       |
| 18 | 10         | QUEEN      | 10         | ACE        | ACE        |
| 19 | 9          | WATERMELON | WILD       | KING       | BELL       |
| 20 | 9          | 10         | QUEEN      | WATERMELON | QUEEN      |
| 21 | CHERRY     | 9          | 10         | 10         | ACE        |
| 22 | JACK       | QUEEN      | CHERRY     | BELL       | 9          |
| 23 | 10         | CHERRY     | ACE        | 9          | WATERMELON |
| 24 | WATERMELON | ACE        | QUEEN      | 10         | 10         |
| 25 | JACK       | 9          | QUEEN      | CHERRY     | ACE        |
| 26 |            | 7          | BELL       | KING       | CHERRY     |
| 27 |            | 10         | 9          |            | QUEEN      |
| 28 |            | BELL       |            |            | ACE        |
| 29 |            |            |            |            | HEART      |
| 30 |            |            |            |            | 10         |
| 31 |            |            |            |            | BELL       |
| 32 |            |            |            |            | ACE        |
| 33 |            |            |            |            | KING       |
| 34 |            |            |            |            |            |

FIG.7

SYMBOL COMBINATION TABLE

| SYMBOL | GRAPHICS | 1 | 2 | 3 | 4 | 5 |
|---|---|---|---|---|---|---|
| WILD | | 0 | 0 | 0 | 0 | 0 |
| 7 | | 0 | 0 | 50 | 300 | 1000 |
| HEART | | 0 | 0 | 35 | 200 | 800 |
| BELL | | 0 | 0 | 30 | 100 | 500 |
| WATERMELON | | 0 | 0 | 20 | 50 | 300 |
| CHERRY | | 0 | 0 | 15 | 35 | 300 |
| ACE | A | 0 | 0 | 10 | 30 | 200 |
| KING | K | 0 | 0 | 10 | 20 | 200 |
| QUEEN | Q | 0 | 0 | 10 | 15 | 100 |
| JACK | J | 0 | 0 | 10 | 15 | 100 |
| TEN | 10 | 0 | 0 | 5 | 15 | 100 |
| NINE | 9 | 0 | 0 | 5 | 10 | 100 |

FIG.8

ASSOCIATION DATA

| TYPE OF ADVERTISEMENT IMAGE | ADVERTISEMENT IMAGE DISPLAY PROGRAM | ADVERTISEMENT IMAGE DISPLAY DATA | ADVERTISEMENT END INPUT REQUEST IMAGE |
|---|---|---|---|
| ADVERTISEMENT IMAGE 301 OF BANNER A | PROGRAM A FOR DISPLAYING BANNER A AT THE TIME OF LOGIN | NOTIFICATION OF EVENT | SECOND TYPE |
| ADVERTISEMENT IMAGE 311 OF BANNER B | PROGRAM B FOR DISPLAYING BANNER B AT A PREDETERMINED TIME | WEATHER INFORMATION | SECOND TYPE |
| ADVERTISEMENT IMAGE 321 OF BANNER C | PROGRAM C FOR DISPLAYING BANNER C AT THE MAIN CONTROL PROCESS | SHOP GUIDANCE | FIRST TYPE |
| ADVERTISEMENT IMAGE 331 OF BANNER D | PROGRAM D FOR DISPLAYING BANNER D AFTER THE UNIT GAME ENDS | PRODUCT ADVERTISEMENT | FIRST TYPE |

FIG.9

REDISPLAY REJECTION DATA TABLE

| TYPE OF ADVERTISEMENT IMAGE | USER IDENTIFICATION INFORMATION | | | | |
| --- | --- | --- | --- | --- | --- |
| | USER XX1001 | USER XX1002 | USER XX1003 | USER XX1004 | ... |
| BANNER A | ○ | ○ | ○ | − | ... |
| BANNER B | − | − | ○ | − | ... |
| BANNER C | − | ○ | ○ | − | ... |
| BANNER D | − | − | ○ | − | ... |

INFORMATION PROCESSOR AND SERVER CAPABLE OF DISPLAYING AN IMAGE WITH A REDISPLAY BUTTON

CROSS-REFERENCE TO RELATED APPLICATION

This Application is Entitled to the benefit of Japanese Pat. App. No. 2017-191605, filed on Sep. 29, 2017.

BACKGROUND OF THE INVENTION

The present invention relates to an information processor and a server.

Conventionally, a banner (icon image) for introducing various kinds of information such as announcement of news, site, product advertisement, etc. is displayed on an information site that can be browsed by an information terminal such as a personal computer, a smartphone, a tablet, and a browsing screen executed as software, or the like (Patent Document 1 (Japanese Patent No. 5552992)).

BRIEF SUMMARY OF THE INVENTION

Such a banner is displayed when viewers of information sites and users of software try to browse information sites or execute software, so the operations of closing (eliminating) the banners by viewers and users are required. At this time, as a viewer or a user, there is a desire to quickly perform an operation of closing a banner because he/she wishes to browse the information site or execute the software quickly. On the other hand, as a provider of a banner, there is a demand for a viewer of an information site and a user of a software to surely browse the banner.

Accordingly, an object of the present invention is to provide an information processor and a server capable of switching an operation mode of closing a banner according to display contents of a banner.

The present invention is a server communicably connected to an information processor having a display capable of displaying an image, wherein,
the server comprising a storage unit for storing
a plurality of image data,
a first end input request image data including a redisplay setting image for setting whether to display the image on the information processor again or not and a first end request image for ending the display of the image,
a second end input request image data including a second end request image for rejecting the redisplay of the image and ending the display of the image, and
association data in which one of the first end input request image data and the second end input request image data is stored in association with the types of the plurality of image data, and a controller for executing
a process of transmitting any one image data of the plurality of image data and either the first end input request image data or the second end input request image data associated based on the association data corresponding to the image data to the information processor.

According to the above configuration, the server transmits the first end input request image data including the redisplay setting image and the end request image and the second end input request image data including the second end request image to the information processor in accordance with the types of the plurality of image data. Thus, depending on the type of the image data, it is possible to set what can be rejected by one action and what can be rejected by two actions. Therefore, image data that is not important to the administrator can be set to be ended by one action, thereby improving the convenience of the input operation by the user. On the other hand, since image data important to the administrator can be set to be ended in two actions, it is possible to prompt the user's attention to an important image as compared with the case of one action.

In addition, according to the present invention, in the server, the first end input request image data is stored in association with a banner advertisement for guiding to pay.

According to the above configuration, the banner advertisement for guiding to pay is rejected by two actions of clicking the redisplay setting image and the end request image. Therefore, as compared with a banner advertisement rejected by one action, a game player can not easily refuse and prompt the game player to pay.

In addition, according to the present invention, in the server, the controller further includes a changing unit that changes the association between the image data and the first end input request image data or the second end input request image data based on the association data by the administrator side.

According to the above configuration, even when it is irrelevant to payment, such as information required for system failure or emergency, if it is important information for the user, it is changed so as to end in two actions, and thus it is possible to prompt the player to pay attention as compared with the case of in one action.

The present invention is an information processor having an input device for accepting input and a display for displaying an image,
the information processor comprising a storage unit for storing
a plurality of image data,
a first end input request image data including a redisplay setting image for setting whether to display the image on the information processor again or not and an end request image for ending the display of the image,
a second end input request image data including a second end request image for rejecting the redisplay of the image and ending the display of the image, and
association data in which one of the first end input request image data and the second end input request image data is stored in association with the types of the plurality of image data,
further comprising a controller configured to execute the following process using the data stored in the storage unit, the controller,
displaying the image onto the display depending on either the first end input request image data or the second end input request image data associated based on any one image data of the plurality of image data and the association data corresponding to the image data.

According to the above configuration, in the information processor, the first end input request image data including the redisplay setting image and the end request image and the second end input request image data including the second end request image are displayed on the display in accordance with the types of the plurality of image data. Thus, depending on the type of the image data, it is possible to set what can be rejected by one action and what can be rejected by two actions. Therefore, image data that is not important to the administrator can be set to be ended by one action, thereby improving the convenience of the input operation by the user. On the other hand, since image data important to the administrator can be set to be ended in two actions, it is possible to prompt the user's attention to an important image as compared with the case of one action.

It is possible to provide an information processor and a server capable of switching an operation mode of closing a banner according to display contents of a banner.

BRIEF DESCRIPTION OF THE DRAWINGS

FIG. 6 is an illustrative view of symbol columns of video reels of the slot game.

FIG. 7 is an illustrative view of a symbol combination table of the slot game.

FIG. 8 is an illustrative view of association data.

FIG. 9 is an illustrative view of a redisplay rejection data table.

DETAILED DESCRIPTION OF THE PREFERRED EMBODIMENT

First Embodiment

The information processor of the present invention will be described based on the drawings.

The game executed in the present embodiment can be executed as application software (program, game data) by being installed in an information processor exemplified by a portable information processor such as a smart phone, a portable computer, a laptop computer, a notebook computer, a tablet type personal computer, a handheld type personal computer, a PDA (Personal Data Assistant), and the like. The application software for executing this game is downloaded from a server (see FIG. 2) or the like by communication means and stored in a storage device (a flash memory 104) in the information processor. Wherein, the communication means may be a bidirectional communication path such as the Internet or a cable television, or may be a broadcast that transmits information only in one direction.

In addition, the application software for executing the game may also be stored in a recording medium such as a floppy disk, a CD-ROM, a DVD-ROM, an MO (magneto-optical disk), a flash memory or the like, and read out from the recording medium as necessary and then installed in the storage device in the information processor.

In the present embodiment, as the information processor, the smartphone 1 shown in FIG. 1 will be described as an example. In addition, in the following description, the smartphone 1 will be described, but the process and operation of the smartphone 1 can be replaced with the invention of a program or game control method.

(Online)

Figure 2:
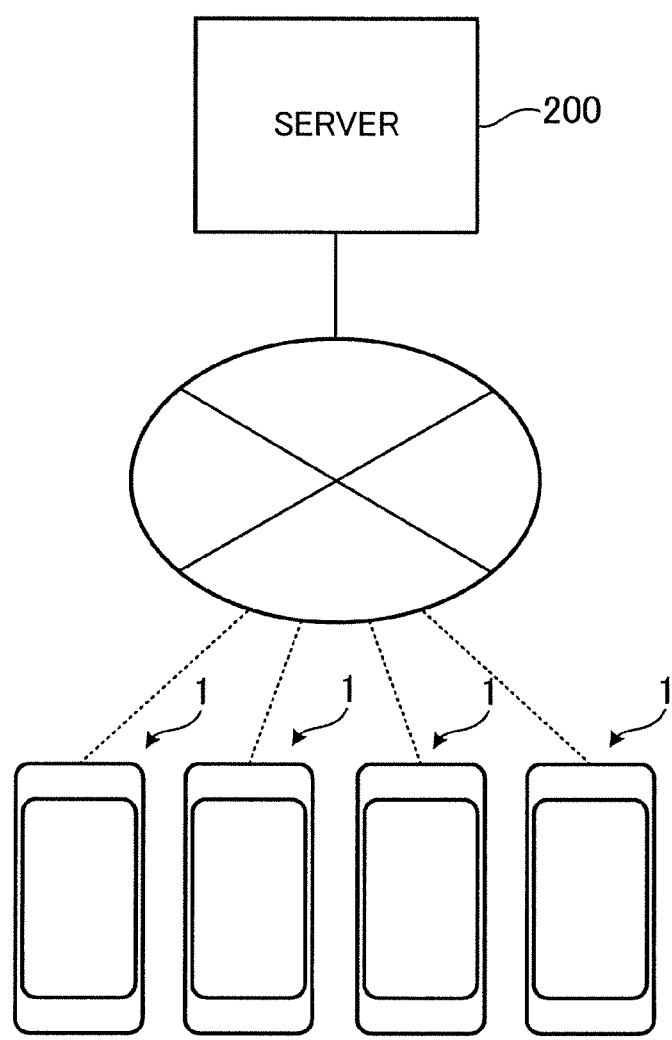
FIG. 2 is an illustrative view of a network environment between the smartphone and a server.

In addition, the game executed in the present embodiment is a slot game and is executed as an online game. Specifically, as shown in FIG. 2, a server 200 managed by a slot game operating organization and smartphones 1 operated by a large number of users are connected via a computer network (Internet).

In this way, the slot game is executed as online. As a result, the user can download the slot game application software from the server 200, install it in the smartphone 1, and execute the slot game. In addition, in the server 200 (management system), exchange of credits (things that can be settled, such as cash, credit card, electronic money, prepaid card etc) possessed by the user to electronic informationized coins (gaming medium) usable in the slot game and management of the coins possessed by the user are also performed.

(Configuration of Smartphone 1)

Figure 3:
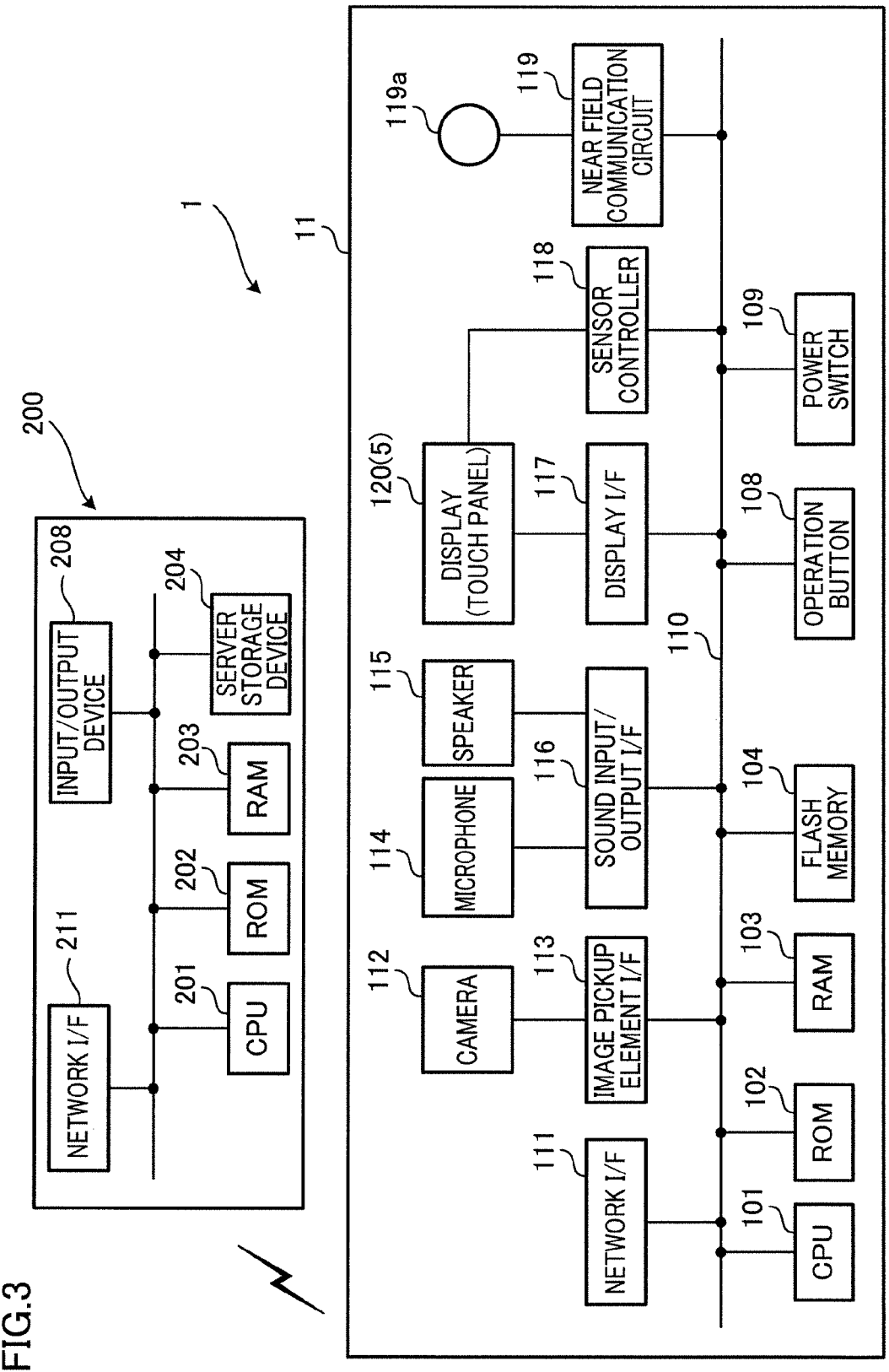
FIG. 3 is a block diagram showing an electric configuration of the smartphone (the information processor).

As shown in FIG. 3, the smartphone 1 includes a CPU 101 (controller), a ROM 102, a RAM 103, a flash memory 104, an operation button 108, a power switch 109, a bus line 110, a network I/F 111, a camera 112, an image pickup element I/F 113, a microphone 114, a speaker 115, a sound input/output I/F 116, a display I/F 117, a sensor controller 118, a short-range communication circuit 119, and an antenna 119a of the short-range communication circuit 119 provided in a cabinet 11. In addition, on the front surface of the cabinet 11, the display 120 having a touch panel 5 (input unit) is installed.

The display 120 is configured to display an image. As a display method of the display 120, various display methods such as a liquid crystal method, an organic electroluminescence method, a CRT (Cathode Ray Tube) method, a plasma method and the like are exemplified.

The CPU (Central Processing Unit) 101 controls the overall operation of the smartphone 1. The ROM (Read Only Memory) 102 stores a program used for driving the CPU 101, such as an IPL (Initial Program Loader).

The RAM (Random Access Memory) 103 is used as a work area of the CPU 101. The flash memory 104 stores an application software (program) for executing the game according to this embodiment, a communication program, various kinds of data such as an image data and a sound data (symbol column, a symbol combination table of a video reel to be described later, game data necessary for a slot game and number of possessed coins etc.). The operation button 108 is a button that is operated when the smartphone 1 is initially set. The power switch 109 is a switch for switching ON/OFF of the power of the smartphone 1.

The network I/F (Interface) 111 is interface for performing a data communication with the server 200 and the like by utilizing a communication network such as the Internet. The camera 112 is a kind of built-in type image pickup unit that captures an image of a subject under the control of the CPU 101 to obtain image data. The image pickup element I/F 113 is a circuit that controls driving of the camera 112. The microphone 114 is a kind of built-in type sound collecting unit for inputting a sound. The sound input/output I/F 116 is a circuit for processing input and output of sound signals between the microphone 114 and between the speaker 115 under the control of the CPU 101. The display I/F 117 is a circuit that transmits image data to the display 120 under the control of the CPU 101. The sensor controller 118 is a circuit that receives an input from the touch panel 5 provided on the display 120. The short-range communication circuit 119 is a communication circuit such as an NFC (Near Field Communication) (registered trademark), a Bluetooth (registered trademark), or the like. The bus line 110 is an address bus, a data bus, or the like for electrically connecting each component such as the CPU 101.

(Overview of Slot Game Executed by Smartphone 1)

In the smartphone 1 having the above configuration, the CPU 101 is programmed to execute the slot game application software.

In the smartphone 1, when the slot game application software is executed, various game start effect images and the like are displayed. Thereafter, when a selection image for starting the "slot game" is selected by the touch panel 5, a login is displayed and the slot game is started (details will be described later) after it is brought into a state where it can communicate with the server 200. For example, when the slot game is started, as shown in FIG. 1, a symbol display area 21 composed of 15 areas in a matrix of 5 columns×3 rows is displayed. Then, a slot game for rearranging a plurality of symbols in the symbol display area 21 is executed (details will be described later).

Note that a plurality of types of slot games to be selected may be prepared, and the rule, the payout mode, and the effect image may be different depending on the type of slot game to be executed. For example, in a certain type of "slot game", a slot game is executed in which a plurality of symbols are rearranged in a symbol display area composed of 9 areas in a matrix of 3 columns×3 rows. In this slot game, a winning is determined by a combination of symbols rearranged on a payline (winning determination) set only in the middle of the symbol display area.

Here, when starting a slot game in the present embodiment, it is basically to consume a predetermined amount of coins (gaming mediums) possessed by a user, and the slot game is started as a consideration for the consumption of the coins. In addition, when a predetermined condition is satisfied, it is possible to start a slot game without consuming any coin (for example, the giving condition of a free game is satisfied, or a slot game can be played without consuming any coin up to a predetermined number of times a day).

The coin (gaming medium) possessed by a user is an electronic information, the user accesses from the smartphone 1 to the server 200, and can exchange a credit for the coin according to the payment method specified by the slot game operating organization. The coin possessed by a user may also be consumed as an expense in order to obtain an effect of affecting the slot game (item), or is consumed as an expense to change the appearance of a character that symbolizes the user, and is a wide variety to use.

In addition, the number of coins possessed by each user managed in the server 200 is shared by communication between the server 200 and each smartphone 1. In the flash memory 104 of the smartphone 1, the number of coins possessed by the user shared with the server 200 is stored.

In addition, the "gaming medium" is not particularly limited, and for example, when the slot game according to the present embodiment is executed by a gaming machine (slot machine) or the like installed in a hall or the like, it may be a medal, a token, an electronic money, a ticket, and the like. The ticket is not particularly limited, and a barcoded ticket may be adopted for example. Alternatively, the gaming medium may be a game point not including valuable information.

(Slot Game: Definitions)

In the slot game executed in the present embodiment, a plurality of symbols are stopped and displayed (rearranged) in the symbol display area 21 after variation (scrolling video of the reel), and the benefit (such as the payout or item advantageous/disadvantageous to the user) is given by the combination of the symbols displayed in the symbol display area 21. In addition, a state in which a plurality of symbols are stop-displayed after variation in the symbol display area 21 is referred to as "rearrangement".

A coin may be given in the payout given based on the combination of the symbols displayed in the symbol display area 21.

The "unit game" is a series of operations from the start of acception of a bet to a state in which a prize is established (the combination of symbols satisfies a predetermined relationship). To put it differently, the unit game includes a single bet time for accepting a bet, a single game time of rearranging stopped symbols, and a single payout time of a payout process of awarding a payout.

(Slot Game Screen)

Next, the slot game screen displayed on the display 120 of the smartphone 1 will be described.

Figure 1:
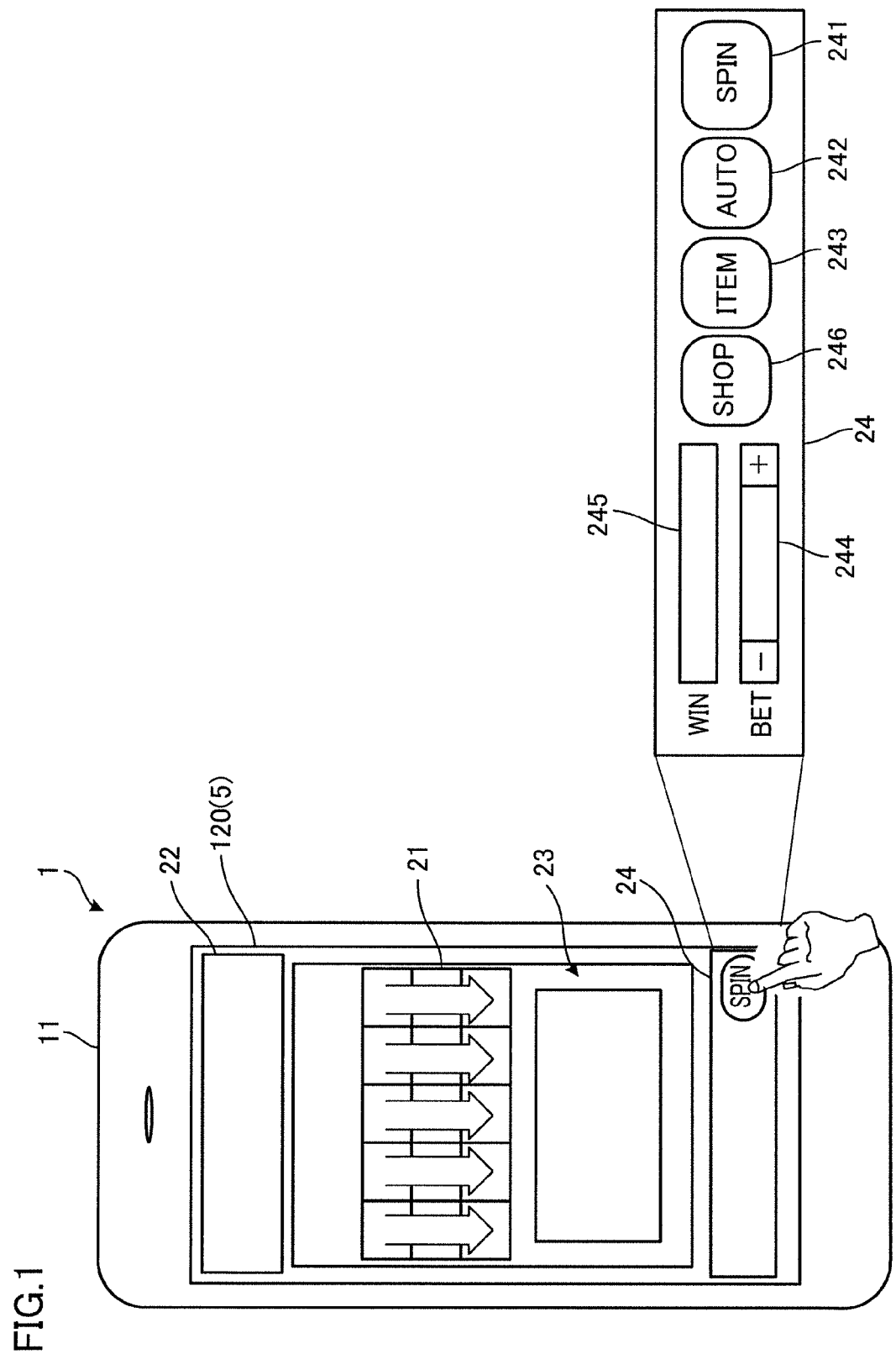
FIG. 1 is an illustrative view showing a display state of a smartphone (an information processor).

As shown in FIG. 1, when a slot game is executed, a slot game screen is displayed on the display 120. In the slot game screen, the symbol display area 21 composed of 15 areas in a matrix of 5 columns×3 rows, a game information display area 22 for displaying information (the number of coins currently possessed, etc.) increasing/decreasing with the execution of the slot game, an effect display area 23 for displaying a dynamic image, a still image, and a message associated with a game in accordance with the development of the slot game, and an operation display area 24 operated by the user for the progress of the slot game are displayed. In the operation display area 24, a spin button 241, an AUTO button 242, an ITEM button 243, a bet button 244, a WIN display unit 245, and a shop button 246 are displayed.

The touch panel 5 that transmits the slot game screen is provided on the entire surface of the display 120. The touch panel 5 makes it possible to detect the coordinate of the site touched by the user's finger or the like. Thus, for example, by touching the image of the spin button 241, one slot game (unit game) can be executed. In addition, by touching the image of the AUTO button 242, the slot game can be consecutively performed. Further, when the image of the ITEM button 243 is touched, the user can select and use the item (game effect that affects the slot game) acquired in the past. In addition, when the image of the shop button 246 is touched, it is possible to access the server 200 from the smartphone 1 and move to the shop in which the credit (things that can be settled, such as cash, credit card, electronic money, prepaid card, or the like possessed by the user) can be exchanged for the coin.

(Symbol Display Area 21)

Figure 4:
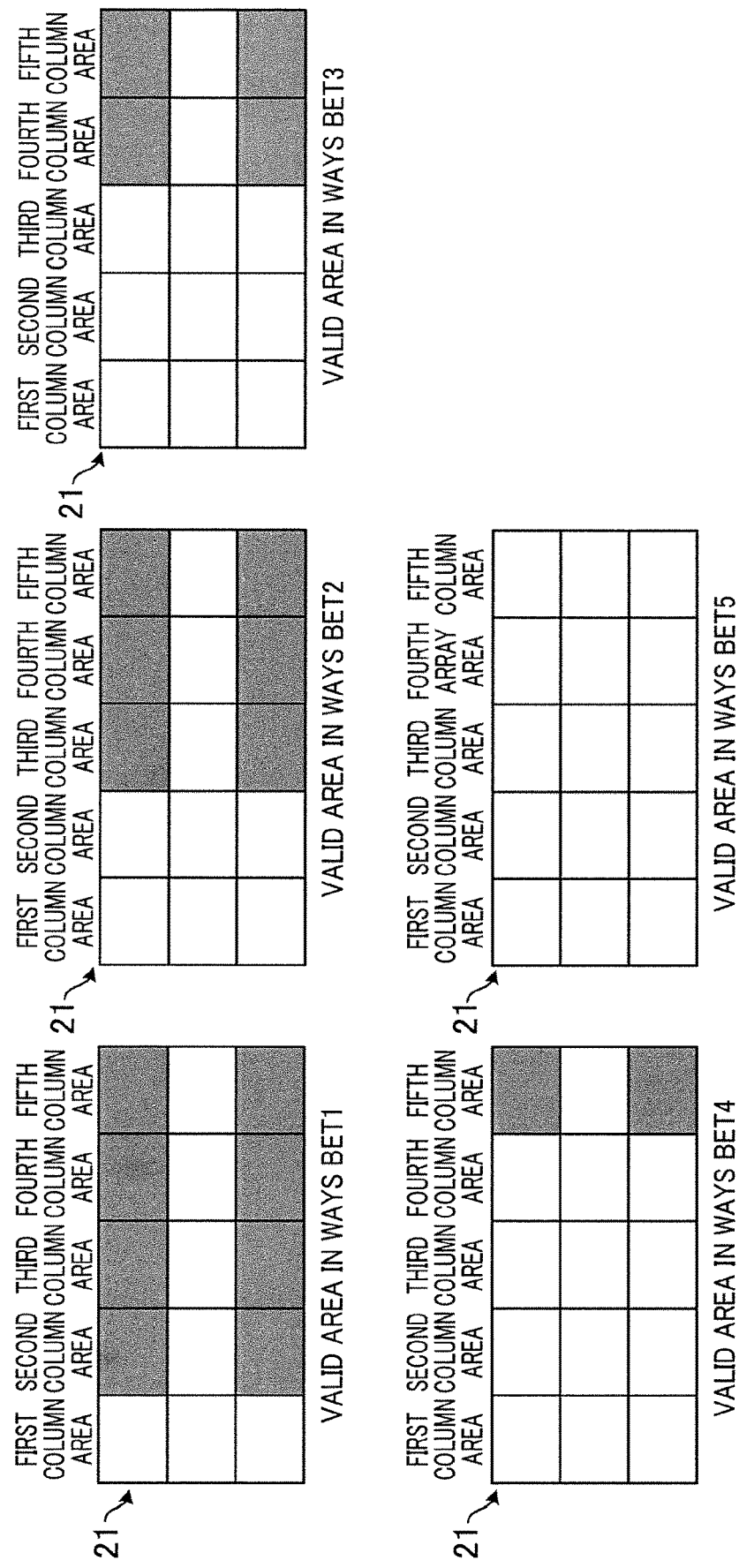
FIG. 4 is an illustrative view of an effective area of "WAYS BET" of a slot game.
Figure 5:
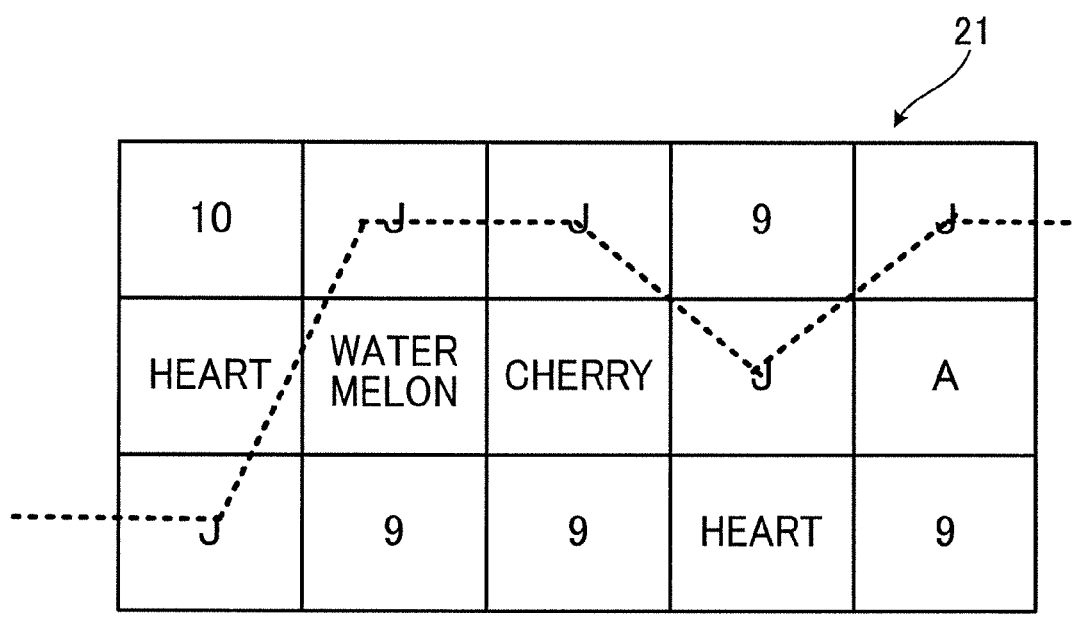
FIG. 5 is an illustrative view of a winning determination example in the "WAYS BET" of the slot game.

In the symbol display area 21 of the slot game, as shown in FIGS. 4 and 5, five column areas (the first column area to the fifth column area) each divided into three areas of an upper row, a middle row, and a lower row (three rows) are set. Also, video reels 3 (REEL 1, REEL 2, REEL 3, REEL 4, REEL 5) are displayed in the first to fifth column areas. In the video reels 3 of the slot game of the present embodiment, operations of rotating and stopping mechanical reels on which a plurality of symbols are drawn on their circumferential surfaces are represented by images. Symbol columns composed of a plurality of symbols are allocated to the video reels 3 (REEL 1, REEL 2, REEL 3, REEL 4, REEL 5) (with reference to FIG. 6).

In the symbol display area 21, the symbol columns allocated to the video reels 3 (REEL 1, REEL 2, REEL 3, REEL 4, REEL 5) are respectively scrolled and stopped after a lapse of a predetermined time. As a result, a part of each symbol column (three consecutive symbols) is sequentially displayed in the symbol display area 21. In the first to fifth column areas of the symbol display area 21, one symbol is allocated to each of the upper, middle, and lower areas is displayed accordingly to the video reels 3 (REEL 1, REEL 2, REEL 3, REEL 4, REEL 5). That is, in the symbol display area 21, 15 symbols of 5 columns×3 rows are displayed.

As described above, in the symbol display area 21, 15 areas are arranged in a matrix pattern so that five column areas (a plurality of columns) and three rows (a plurality of rows) of the upper row, the middle row, and the lower row cross each other.

In the slot game, the determination of winning adopts "LEFT TO RIGHT" type. First, the area as the object of the winning determination is determined from the 15 areas in 5 columns×3 rows of the symbol display area 21 by selecting five stages of the WAYS BET (WAYS BET 1, WAYS BET 2, WAYS BET 3, WAYS BET 4, WAYS BET 5) (determination of an valid area) (see FIG. 4). Then, if symbols stopped in the area as the object of the winning determination are consecutively connected in a predetermined number from the first column area to the fifth column area, it becomes the winning (see FIG. 5).

Wherein, the selection of five stages of WAYS BET (WAYS BET 1, WAYS BET 2, WAYS BET 3, WAYS BET 4, WAYS BET 5) is performed by touching the "+" button and "−" button (see FIG. 1) of the bet button 244. In addition, one coin is required to select WAYS BET 1. Also, three coins are required to select WAYS BET 2. In addition, seven coins are required to select WAYS BET 3. In addition, to select WAYS BET 4, fifteen coins are required. In addition, to select WAYS BET 5, twenty-five coins are required.

More specifically, as shown in FIG. 4, when "WAYS BET 1" is selected, the upper row, the middle row, and the lower row of the first column area, the middle row of the second column area, the middle row of the third column area, the middle row of the fourth column area, and the middle row of the fifth column area of the symbol display area 21 become the object of the winning determination (valid). In addition, when "WAYS BET 2" is selected, the upper row, the middle row, and the lower row of the first column area, the upper row, the middle row and the lower row of the second column area, the middle row of the third column area, the middle row of the fourth column area, and the middle row of the fifth column area of the symbol display area 21 become the object of the winning determination (valid). In addition, when "WAYS BET 3" is selected, the upper row, the middle row, and the lower row of the first column area, the upper row, the middle row and the lower row of the second column area, the upper row, the middle row and the lower row of the third column area, the middle row of the fourth column area, and the middle row of the fifth column area of the symbol display area 21 become the object of the winning determination (valid). In addition, when "WAYS BET 4" is selected, the upper row, the middle row, and the lower row of the first column area, the upper row, the middle row and the lower row of the second column area, the upper row, the middle row and the lower row of the third column area, the upper row, the middle row and the lower row of the fourth column area, and the middle row of the fifth column area of the symbol display area 21 become the object of the winning determination (valid). In addition, when "WAYS BET 5" is selected, the upper row, the middle row, and the lower row of the first column area, the upper row, the middle row and the lower row of the second column area, the upper row, the middle row and the lower row of the third column area, the upper row, the middle row and the lower row of the fourth column area, and the upper row, the middle row and the lower row of the fifth column area of the symbol display area 21 become the object of the winning determination (valid).

For example, as shown in FIG. 5, when the "WAYS BET 5" is selected, all areas of the symbol display area 21 become the objects of the winning determination (validated). Then, as shown in FIG. 5, when the symbols "J: Jack" are respectively stopped in the lower row of the first column area, the upper row of the second column area, the upper row of the third columns area, the middle row of the fourth column area, the upper row of the fifth row column area, the symbols "J: Jack" are consecutively connected up to five from the first column area to the fifth column area ("LEFT TO RIGHT") to establish one winning. As described above, in the "LEFT TO RIGHT" type, even if the symbols are stopped in a wild disorder at a glance, if they are connected consecutively from the first column area to the fifth column area, the winning is determined. In addition, in the slot game of the present embodiment, the "LEFT TO RIGHT" type is adopted, but adopting a line type in which a line formed by connecting only the middle row of the column area of each column is a winning line is also possible. Further, a scatter type may be adopted for determining the winning according to the number of symbols of the same type displayed in the symbol display area 21.

(Symbol Columns of the Video Reels)

Next, with reference to FIG. 6, the configuration of the symbol array included in the video reels 3 of the slot game will be described.

As shown in FIG. 6, symbol columns composed of the symbols corresponding to code numbers "0" to "33" are allocated to "REEL 1", "REEL 2", "REEL 3", "REEL 4", and "REEL 5" of the video reels 3, respectively. Normal symbols such as "7", "HEART", "BELL", "WATERMELON", "CHERRY", "ACE (A)", "KING (K)", "QUEEN (Q)", "JACK (J)", "10", "9" and "WILD" symbol which is a universal symbol (symbol of almighty) as an alternate of another symbol are included in the types of symbols arranged in each symbol column of the video reels 3.

(Symbol Combination Table)

Next, with reference to FIG. 7, the symbol combination table is illustrated. FIG. 7 is an illustrative view of a symbol combination table used in the slot game according to the present embodiment.

The symbol combination table of the slot game defines the number of coins to be paid out (payout) for the symbol combination (symbol number) of symbols relating to winning (WIN). In the slot game, the scrolling of the symbol column of the video reels 3 is stopped, and in an area of the symbol display area 21, which becomes the object of the winning determination by the WAYS BET described above, when a predetermined types of symbols are connected up to a predetermined number from the first column area to the fifth column area, the winning is established. Then, according to the winning, a benefit such as a payout is given to the user.

Basically, for each symbol of "7", "HEART", "BELL", "WATERMELON", "CHERRY", "A", "K", "Q", "J", "10", "9", when symbols of the same type are connected with each other up to 3 (3 Kind), 4 (4 Kind), or 5 (5 Kind) by the WAYS BET from the first column area to the fifth column area in the area which is the object of the winning determination, the winning is established. For the symbol of "WILD", it is substituted for each type of symbol of "7", "HEART", "BELL", "WATERMELON", "CHERRY", "A", "K", "Q", "J", "10", and "9".

For example, when "WAYS BET 3" is selected, the upper row, the middle row, and the lower row of the first column area, the upper row, the middle row and the lower row of the second column area, the upper row, the middle row and the lower row of the third column area, the middle row of the fourth column area, and the middle row of the fifth column area of the symbol display area 21 become the object of the winning determination (valid). Then, the scrolling of each symbol column of the video reels 3 (REEL 1, REEL 2, REEL 3, REEL 4, REEL 5) is stopped, and when the symbols "7" are respectively stopped in the lower row of the first column area, the upper row of the second column area, and the middle row of the third column area, the symbols "7" are connected with each other up to three from the first column area to the third column area ("LEFT TO RIGHT") to establish a winning ("3 Kind of "7" is established). In this case, referring to the symbol combination table of FIG. 7, "50" is determined as the payout amount of coins. Then, a payout is given based on the determined payout amount of the coins.

In addition, in the slot game, the required bet amount (WAYS BET 1: 1 coin, WAYS BET 2: 3 coins, WAYS BET 3: 7 coins, WAYS BET 4: 15 coins, WAYS BET 5: 25 coins) are determined in each selection of 5 stages of WAYS BET, respectively. In addition, it is also possible to select multiple WAYS BETs in the unit game. For example, when WAYS BET 3 (7 coins) is selected up to three times, 21 coins ("7"×"3"=21) are required for the total bet amount, but when the winning of 3 Kind of "7" is established, "50"×"3"="150" is determined as the payout amount of coins.

(Server 200)

As shown in FIG. 4, the server 200 includes a server CPU 201, a server ROM 202, a server RAM 203, a server storage device 204, an input/output device 208, and a network I/F 211. These components are electrically connected to each other via a bus.

The server CPU 201 controls the overall operation of the server 200 by reading programs and various data stored in the server ROM 202, the server RAM 203, and the server storage device 204. The server ROM 202 stores a program used for driving the server CPU 201 such as an IPL (Initial Program Loader). The server RAM 203 is used as a work area of the server CPU 201.

The network I/F 211 is an interface for performing data communication with the smartphone 1 or the like using a communication network such as the Internet.

The server storage device 204 stores application software (program) for executing the banner process of this embodiment, communication program, various data such as image data and sound data (association data necessary for the process to be described later and a redisplay rejection data table or the like).

The input/output device 208 (corresponding to the change unit) is a device performing an input operation and a device performing an output operation. Specifically, a touch panel or the like can be cited. In addition, examples of the device on which the input operation is performed include a keyboard, a button, a touch pad, a mouse, a microphone, and the like. Further, examples of device on which output is performed include a display, a speaker, and the like.

(Association Data)

Next, the association data will be described with reference to FIG. 8. The association data shown in FIG. 8 is stored in the server storage device 204 of the server 200.

The association data associates advertisement image display program, advertisement image display data (corresponding to image data), and advertisement end input request image (the first type corresponding to the first end input request image data or the second type corresponding to the second end input request image data) with four advertisement images (banner A, banner B, banner C, banner D: corresponding to the image data) respectively and stored in the server storage device 204. That is, the four advertisement images (banner A, banner B, banner C, banner D: image data) are associated with either one of the first type of advertisement end input request image or the second type of advertisement end input request image respectively.

In the four advertisement images (banner A, banner B, banner C, banner D), the display image is written as advertisement image display data. Besides, the timing at which the advertisement image is displayed is determined by the advertisement image display program. In addition, the advertisement end input request image is a procedure screen for eliminating (closing) the displayed advertisement image, and the first type and the second type are prepared. In the first type, after the advertisement image end button (corresponding to the first end request image) is selected after checking a check box (corresponding to the redisplay setting image), the displayed advertisement image is eliminated, and then, the advertisement image is not displayed again. In the second type, the advertisement image end button (corresponding to the second end request image) is selected so that the displayed advertisement image is eliminated and then the advertisement image is not displayed again.

Figure 20:
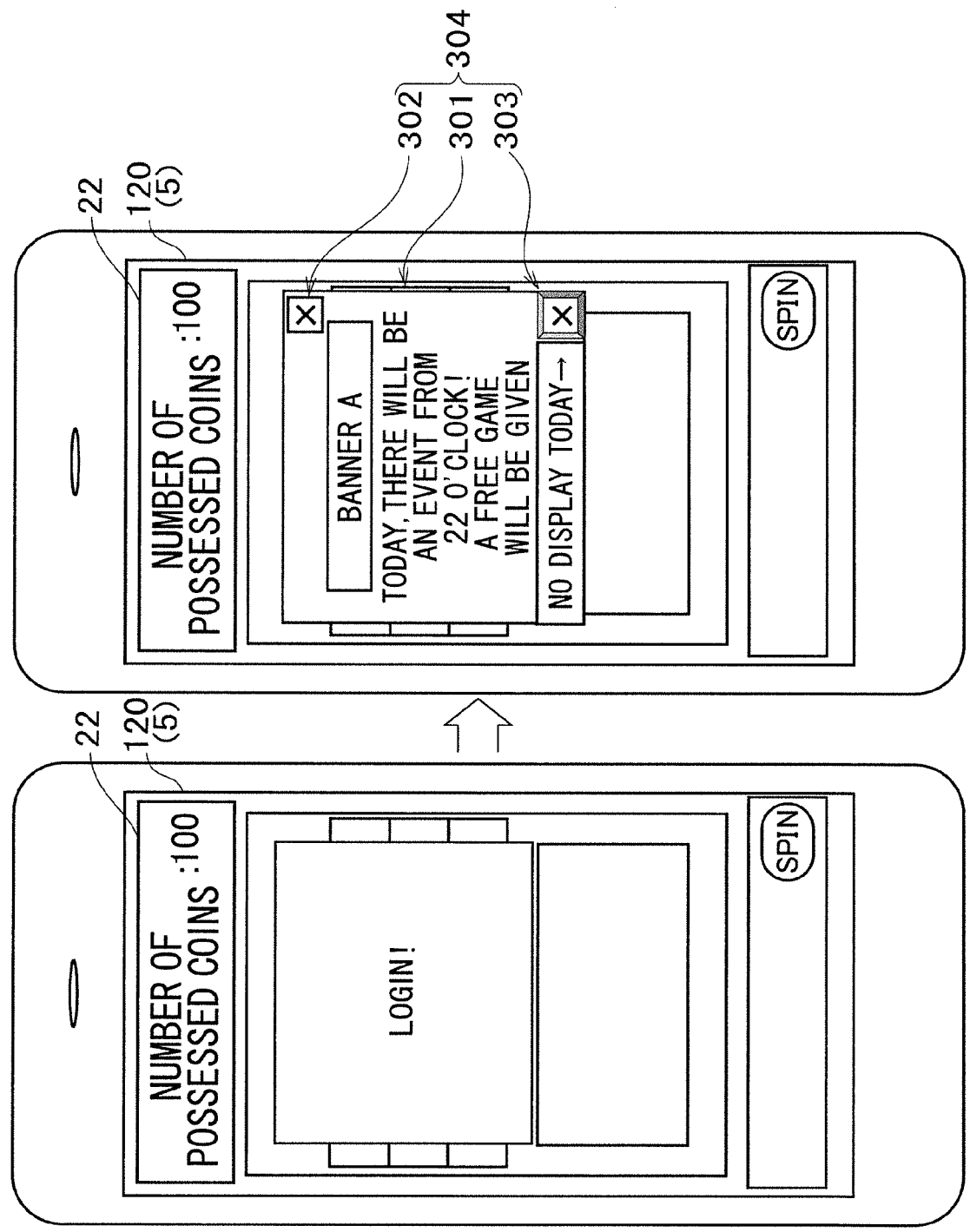
FIG. 20 is an illustrative view of an advertisement image of the banner A displayed on the display.

Specifically, as shown in FIG. 8, in the advertisement image of the banner A, a display image related to notification of the event is written in the advertisement image display data. Besides, the timing at which the notification of the event is displayed in the banner A is the time when the program A has logged in the slot game executed by the smartphone 1. Also, as shown in FIG. 20, an advertisement end input request image 304 is the second type, and when an advertisement image end button 303 is selected, an advertisement image 301 of the displayed banner A is eliminated (closed), and thus the advertisement image 301 of the banner A is not displayed again after that. In addition, when a close button 302 is simply selected, the advertisement image 301 of the displayed banner A is temporarily eliminated (closed), but thereafter the advertisement image 301 of the banner A is redisplayed at a predetermined timing.

Figure 21:
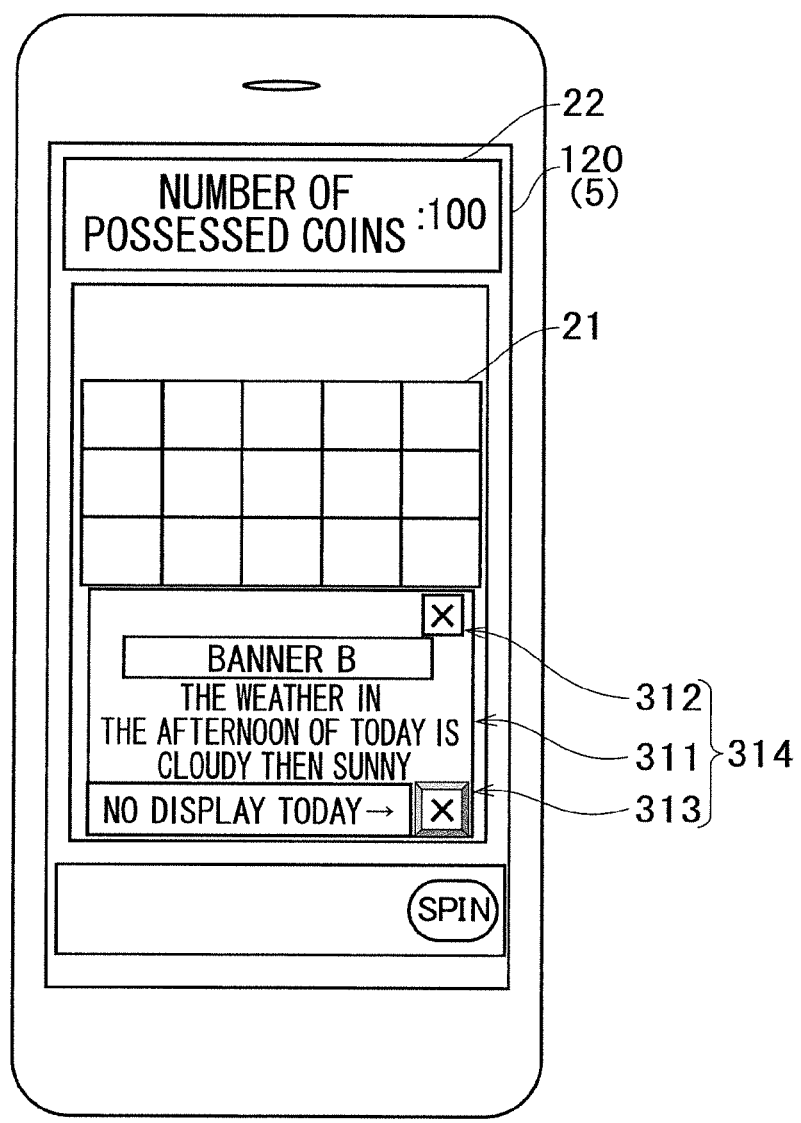
FIG. 21 is an illustrative view of an advertisement image of the banner B displayed on the display.

In addition, in the advertisement image of the banner B, information related to the weather is written in the advertisement image display data (the weather information is externally received and updated timely). Besides, the timing at which the information on the weather is displayed in the banner B is a predetermined time (for example, 6:00 am) specified by the program B. Also, as shown in FIG. 21, an advertisement end input request image 314 is the second type, and when an advertisement image end button 313 is selected, an advertisement image 311 of the displayed banner B is eliminated (closed), and thus the advertisement image 311 of the banner B is not displayed again after that. In addition, when a close button 312 is simply selected, the advertisement image 311 of the displayed banner B is temporarily eliminated (closed), but thereafter the advertisement image 311 of the banner B is redisplayed at a predetermined timing.

Figure 22:
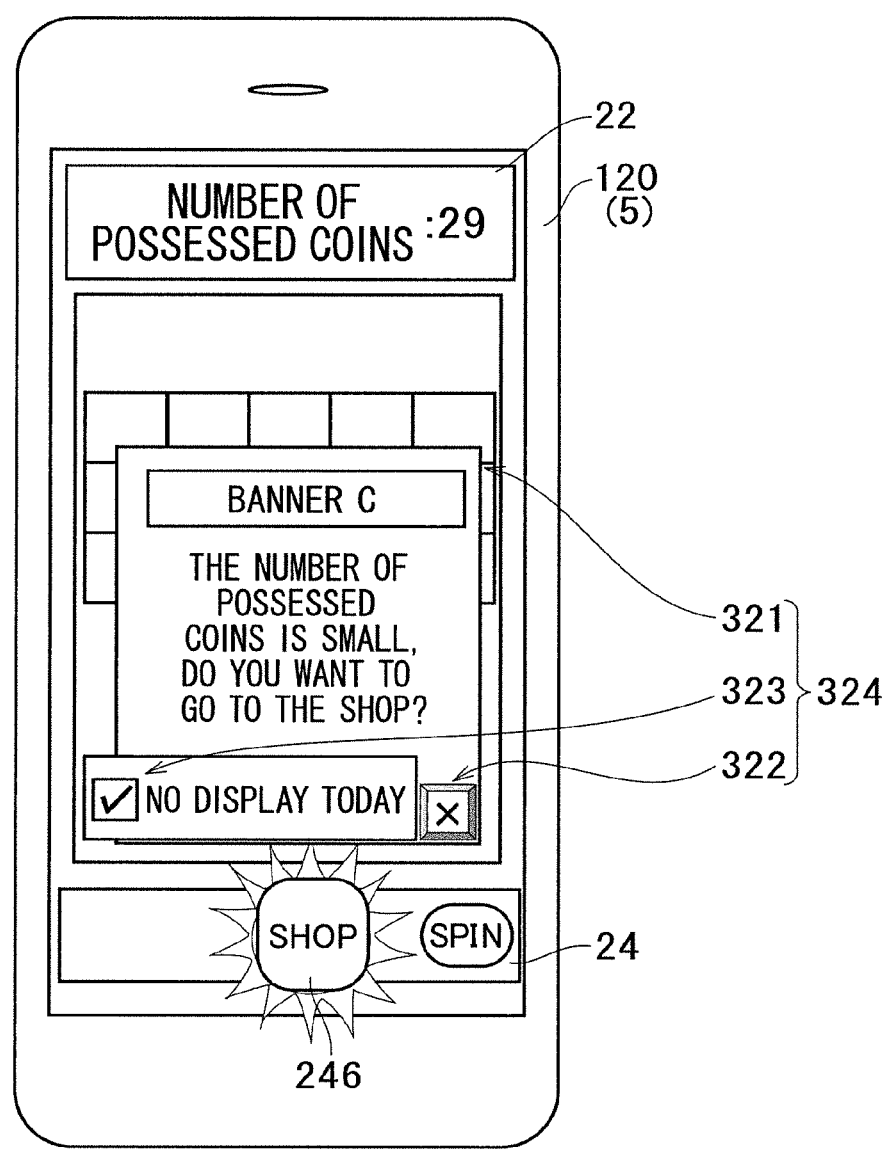
FIG. 22 is an illustrative view of an advertisement image of the banner C displayed on the display.

In addition, in the advertisement image of the banner C, notification information for guiding to the shop is written in the advertisement image display data (corresponding to a banner advertisement for guiding to pay). Besides, the timing at which the notification information for guiding to the shop is displayed in the banner C is during the main control process (details will be described later) performed by the program C. Also, as shown in FIG. 22, an advertisement end input request image 324 is the first type, and after checking a check box 323, when an advertisement image end button 322 is selected, an advertisement image 321 of the displayed banner C is eliminated (closed), and thereafter the advertisement image 321 of the banner C is not displayed again. In addition, when the advertisement image end button 322 is selected without checking the check box 323, the advertisement image 321 of the displayed banner C is temporarily eliminated (closed), but thereafter, the advertisement image 321 of the banner C is redisplayed at a predetermined timing.

As described above, in the advertisement image of banner C guiding to the shop in which the credit (things that can be settled, such as cash, credit card, electronic money, prepaid card etc. possessed by the user) can be exchanged for a coin, it is possible to prevent the advertisement image 321 of the banner C from being redisplayed after the two actions of checking the check box 323 and selecting the advertisement image end button 322. Therefore, compared to the advertisement image of the banner A and the advertisement image of the banner B, which are prevented from being redisplayed afterward in one action, the advertisement image 321 of the banner C takes much time and effort, so that the advertisement image of the banner C for guiding to the shop is browsed for a long time, and as a result, it is possible to guide the game user to the shop.

Figure 23:
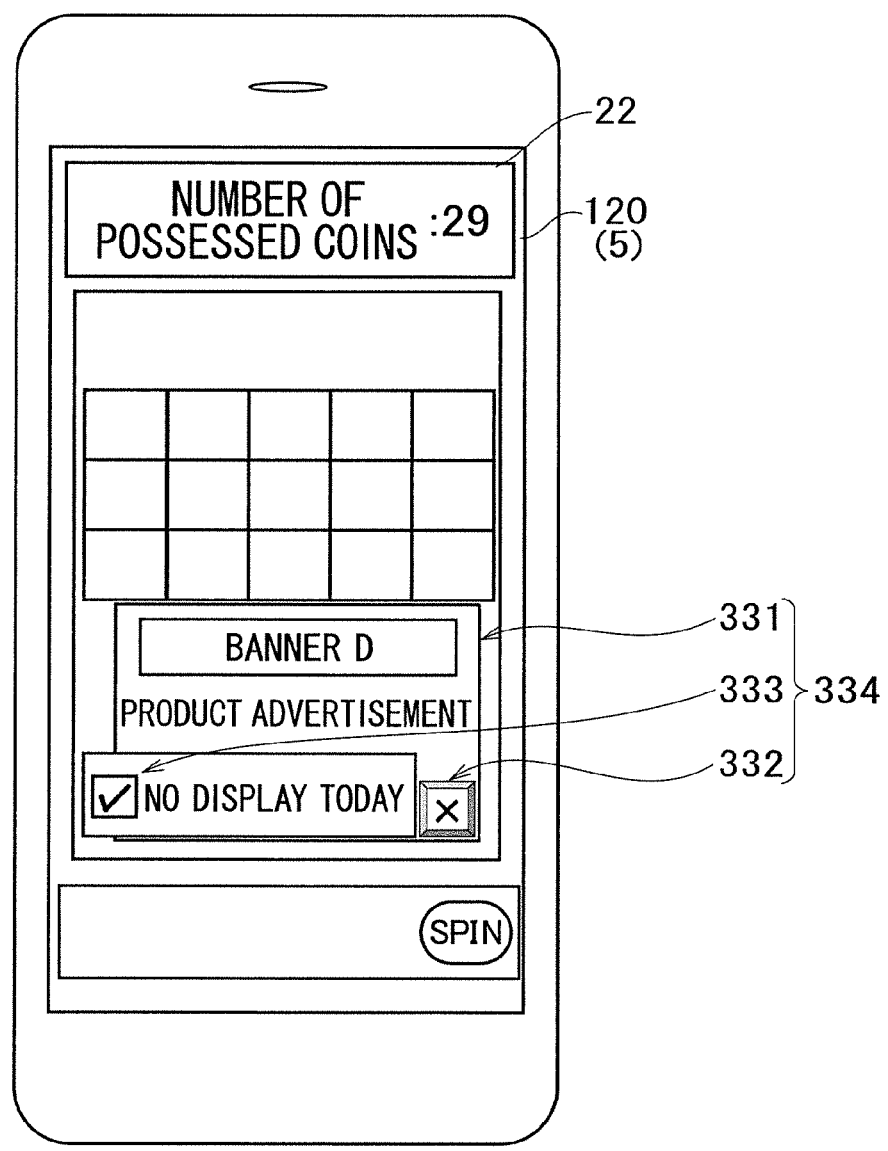
FIG. 23 is an illustrative view of an advertisement image of the banner D displayed on the display.

In addition, in the advertisement image of the banner D, information of the product advertisement of the sponsor is written in the advertisement image display data. Besides, the timing at which the information on the product advertisement of the sponsor is displayed in the banner D is the time at the end of the unit game of the slot game executed by the program D (details will be described later). Also, as shown in FIG. 23, an advertisement end input request image 334 is the first type, and after checking a check box 333, when an advertisement image end button 332 is selected, an advertisement image 331 of the displayed banner D is eliminated, and thereafter the advertisement image 331 of the banner D is not displayed again. In addition, when the advertisement image end button 332 is selected without checking the check box 333, the advertisement image 331 of the displayed banner D is temporarily eliminated (closed), but thereafter, the advertisement image 331 of the banner D is redisplayed at a predetermined timing.

In addition, by operating the input/output device 208, the administrator can change the association of either one of the first type of advertisement end input request image or the second type of the advertisement end input request image corresponding to the four advertisement images (banner A, banner B, banner C, banner D) in the association data. By this means, it is changed so as to end in two actions when it is important information for the user such as information required for software failure or emergency, and thus it is possible to prompt the user to pay attention as compared with the case of in one action.

(Redisplay Rejection Data Table)

Next, with reference to FIG. 9, the redisplay rejection data table will be described. The redisplay rejection data table shown in FIG. 9 is stored in the server storage device 204 of the server 200.

In the redisplay rejection data table, the four advertisement images (the advertisement image 301 of the banner A, the advertisement image 311 of the banner B, the advertisement image 321 of the banner C, and the advertisement image 331 of the banner D) are associated with identification information of a plurality of smartphones 1 being used (user identification information). Further, in the smartphone 1 having the associated identification information, each of the four advertisement images (the advertisement image 301 of the banner A, the advertisement image 311 of the banner B, the advertisement image 321 of the banner C, and the advertisement image 331 of the banner D) can be attached with a flag ("O" In FIG. 9) indicating rejection of each advertisement image. The flag indicating the rejection of the redisplay of the advertisement image is updated by the server 200 receiving the "user identification information and redisplay rejection signal" transmitted from the smartphone 1 by the banner A display process or the like which will be described later. This redisplay rejection data table is referred to in a banner A display process and the like which will be described later.

For example, as shown in FIG. 9, if it is the smartphone 1 having the user identification information "user X X 1002", the flags ("O") indicating the rejection of redisplaying the advertisement image are attached to the advertisement image of the banner A and the advertisement image of the banner C. In addition, if it is the smartphone 1 having the user identification information "user X X 1003", the flags ("O") indicating the rejection of redisplaying the advertisement image are attached to the advertisement image of the banner A, the advertisement image of the banner B, the advertisement image of the banner C, and the advertisement image of the banner D.

[Contents of Program]

Next, with reference to FIGS. 10 to 18, programs of the slot game and the display state of the banner executed by the smartphone 1 and the server 200 will be described.

(Main Control Process)

Figure 10:
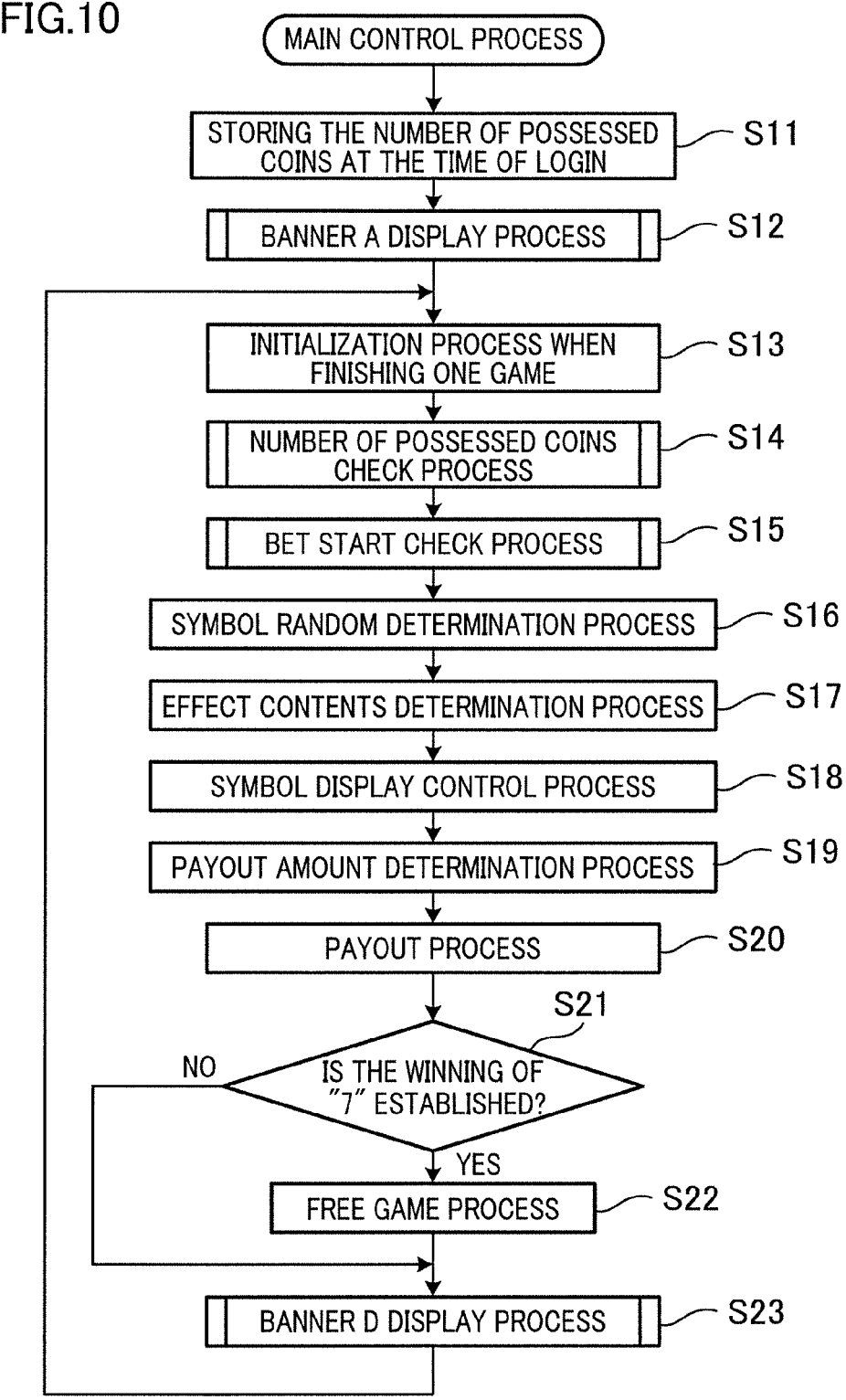
FIG. 10 is a diagram showing a flowchart of a main control process.
Figure 11:
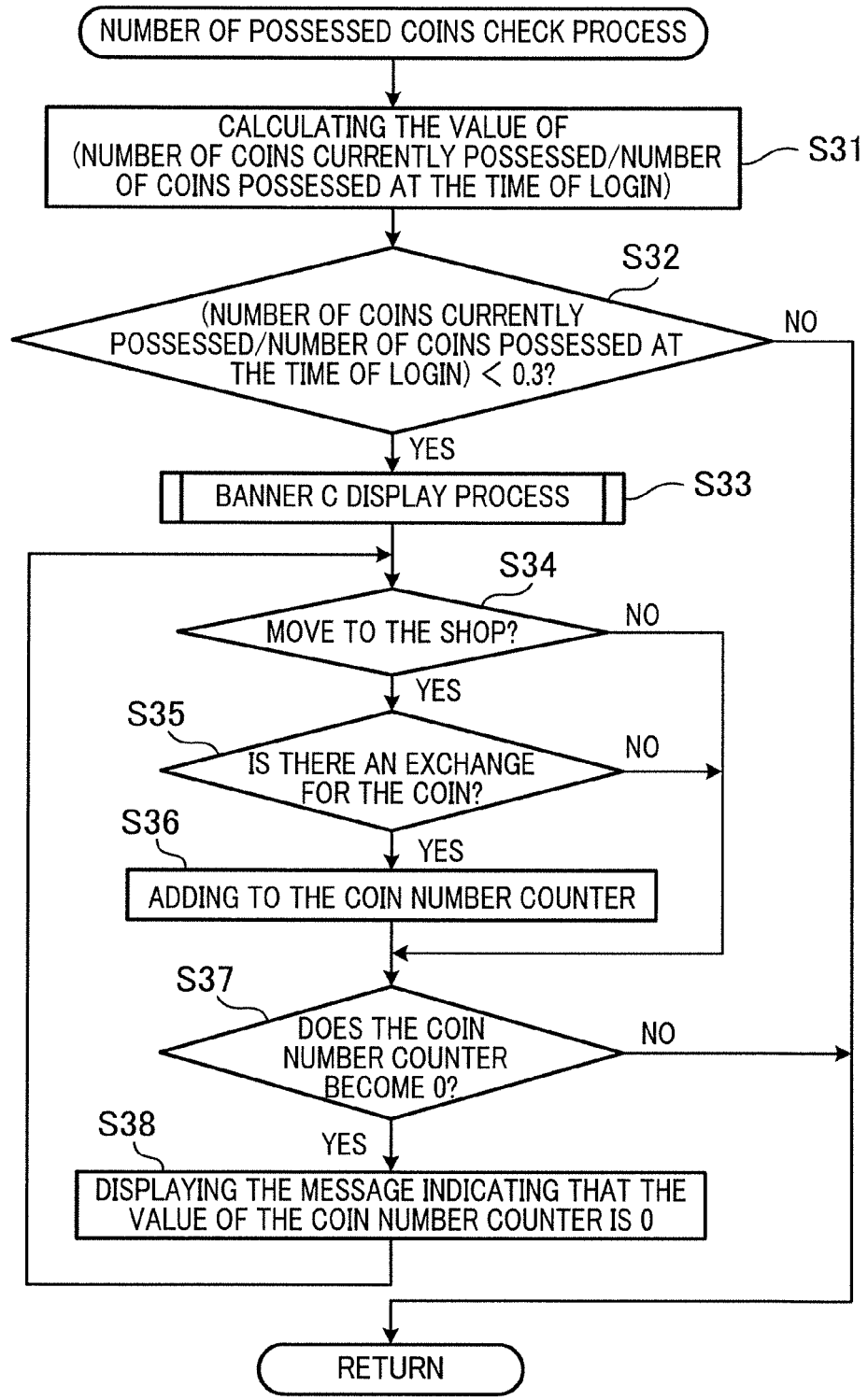
FIG. 11 is a diagram showing a flowchart of a possessed coin number check process.

First, with reference to FIG. 10, the main control process will be described.

First, when the slot game application software is executed, the start effect image of the slot game and the like are displayed on the display 120. Then, when a selection image for starting the "slot game" displayed on the display 120 is selected by the touch panel 5, login is displayed on the display 120 (with reference to FIG. 20). At this time, by communicating with the server 200, the number of coins possessed by the user managed by the server 200 is shared by communication between the server 200 and the smartphone 1. That is, the number of coins possessed by the user shared with the server 200 is stored in the value of the coin number counter of the flash memory 104 of the smartphone 1. Then, as shown in FIG. 20, the value of the coin number counter of the flash memory 104 shared with the server 200 is displayed in the game information display area 22 of the display 120 in the form of "number of possessed coins: OO (number)".

Furthermore, in the present embodiment, when a selection image for starting the "slot game" displayed on the display 120 is selected by the touch panel 5 and logged in the slot game, the value of the coin number counter at the time of login (number of coins possessed by the user at the time of login) is stored in the flash memory 104 as the value of the number of possessed coins at the time of login (S11).

(Banner A Display Process)

Figure 13:
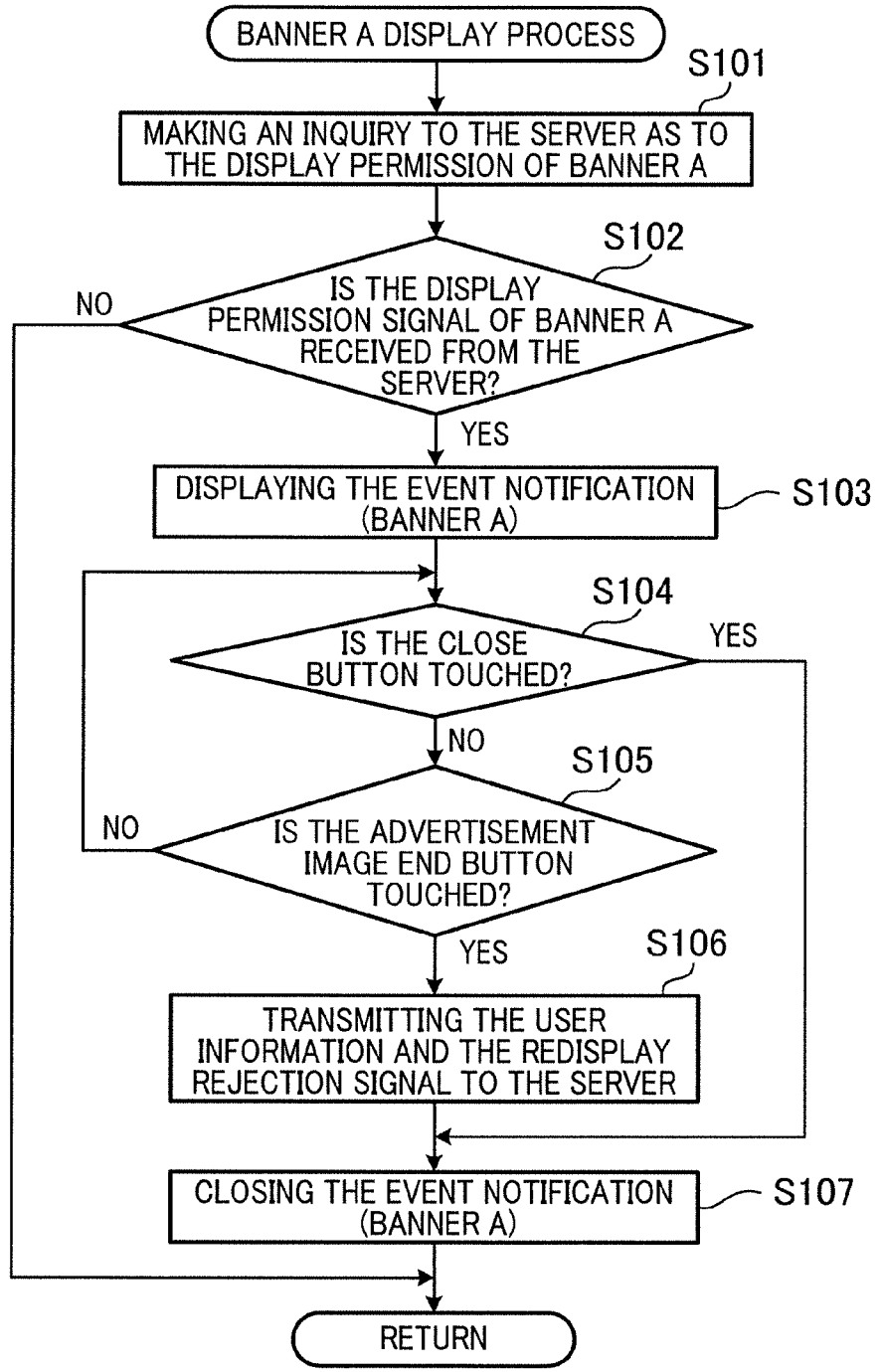
FIG. 13 is a diagram showing a flowchart of a banner A display process.

Next, the CPU 101 executes the banner A display process (S12). In this banner A display process, as shown in the flow of FIG. 13, first, the CPU 101 makes an inquiry to the server 200 as to whether or not to permit display of the advertisement image 301 of banner A (S101). Then, the CPU 101 determines whether or not a display permission signal of the banner A has been received from the server 200 (S102). If the display permission signal of the banner A is not received from the server 200 (S102: NO), the present process is terminated.

On the other hand, when the display permission signal of the banner A is received from the server 200 (S102: YES), based on the association data (the advertisement image display data of the display contents with respect to the notification of the event, the advertisement end input request image and the like, with reference to FIG. 8) corresponding to the advertisement image of the banner A transmitted together with the display permission signal of the banner A from the server 200, the advertisement end input request image 304 is displayed as shown in FIG. 20 (S103). In the present embodiment, as shown in FIG. 20, in the advertisement end input request image 304, the advertisement image 301 of banner A concerning the event notification of "Today, there will be an event from 22 o'clock! A free game will be given", the close button 302, and the advertisement image end button 303 accompanied by a message "No display today" are displayed.

Next, the CPU 101 determines whether or not the close button 302 is selected (S104). When the close button 302 is not selected (S104: NO), it is determined whether or not the advertisement image end button 303 is selected (S105). Then, if the advertisement image end button 303 is not selected (S105: NO), the process returns to S104.

On the other hand, when the advertisement image end button 303 is selected (S105: YES), the CPU 101 transmits "user information and redisplay rejection signal" to the server 200 (S106).

Figure 17:
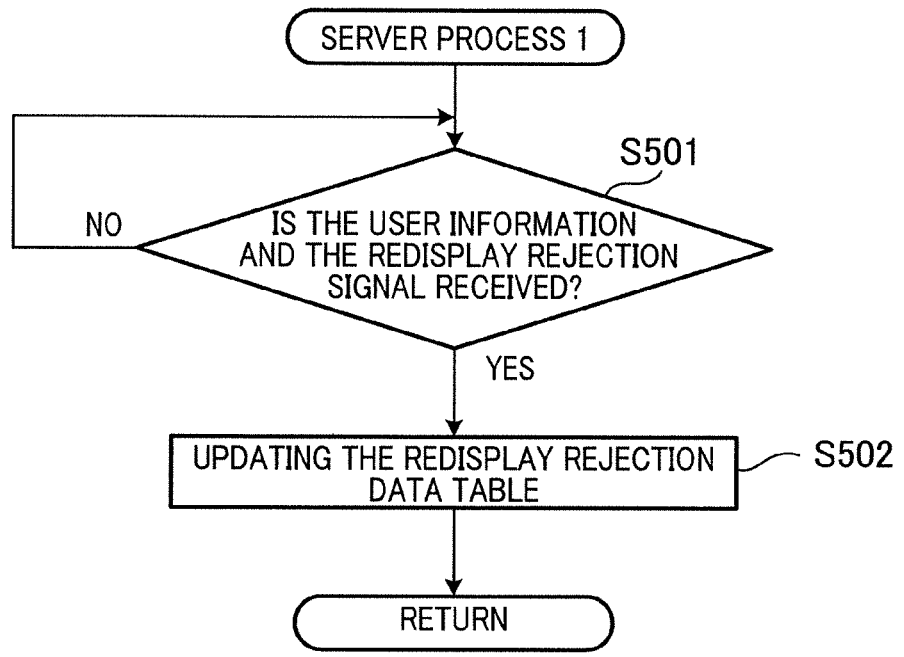
FIG. 17 is a diagram showing a flowchart of server process 1.

In addition, receiving the "user identification information and redisplay rejection signal", the server 200 refers to the redisplay rejection data table shown in FIG. 9 and attaches the flag ("O" In FIG. 9) indicating the rejection of redisplay in the item of the advertisement image of the banner A corresponding to the user identification information associated with the sender smartphone 1, and the redisplay rejection data table is updated (with reference to the server process 1 in FIG. 17 which will be described later). For example, if the user identification information of the sender smartphone 1 is "user xx 1001", the flag ("O") indicating the rejection of redisplaying the advertisement image is attached to the item of the advertisement image of banner A, and thereafter, the redisplay rejection data table is updated.

After the process in S106 or when the close button 302 is selected in the process of S104 (S104: YES), the advertisement end input request image 304 is closed (S107). Thereafter, the present process is terminated.

After the banner A display process in S12, the process returns to the main control process and the CPU 101 performs an initialization process when finishing one game (S13) in order to start the slot game. For example, unnecessary data for each unit game in the work area of the flash memory 104, such as the WAYS BET enabled in the previous unit game and the symbol determined to be displayed in the symbol display area 21 by the random determination is cleared.

(Number of Possessed Coins Check Process)

Next, the CPU 101 performs the number of possessed coins check process (S14). The number of possessed coins check process will be described with reference to the flow in FIG. 11.

First, the CPU 101 calculates a value obtained by dividing the value of the coin number counter provided in the flash memory 104 by the value of the number of coins possessed at the time of login stored in the process of S11 (S31). That is, the ratio (%) of the number of coins currently possessed by the user with respect to the number of coins possessed when the user logged in the slot game is calculated. For example, as shown in FIG. 20, when the value of the current coin number counter (the number of possessed coins) is "29" and the value of the number of coins possessed at the time of login stored in the process of S11 is "100", the value of "0.29 (29%)" is calculated by "29÷100=0.29".

Next, the CPU 101 determines whether or not the value calculated in the process of S31 is smaller than "0.3 (30%)" (S32). That is, it is determined whether the ratio (%) of the number of coins currently possessed by the user with respect to the number of coins possessed when the user logged in the slot game is smaller than "0.3 (30%)". Then, if the value calculated in the process of S31 is not smaller than "0.3 (30%)" (S32: NO), the present process is terminated. For example, when the value of the current coin number counter (the number of possessed coins) is "50" and the value of the number of coins possessed at the time of login stored in the process of S11 is "100", the value of "0.5 (50%)" is calculated by "50÷100=0.5", and the calculated "0.5 (50%)" is not smaller than "0.3 (30%)", so the present process is terminated.

On the other hand, when the value calculated in the process of S31 is smaller than "0.3 (30%)" (S32: YES), the CPU 101 performs a banner C display process (S33).

(Banner C Display Process)

Figure 15:
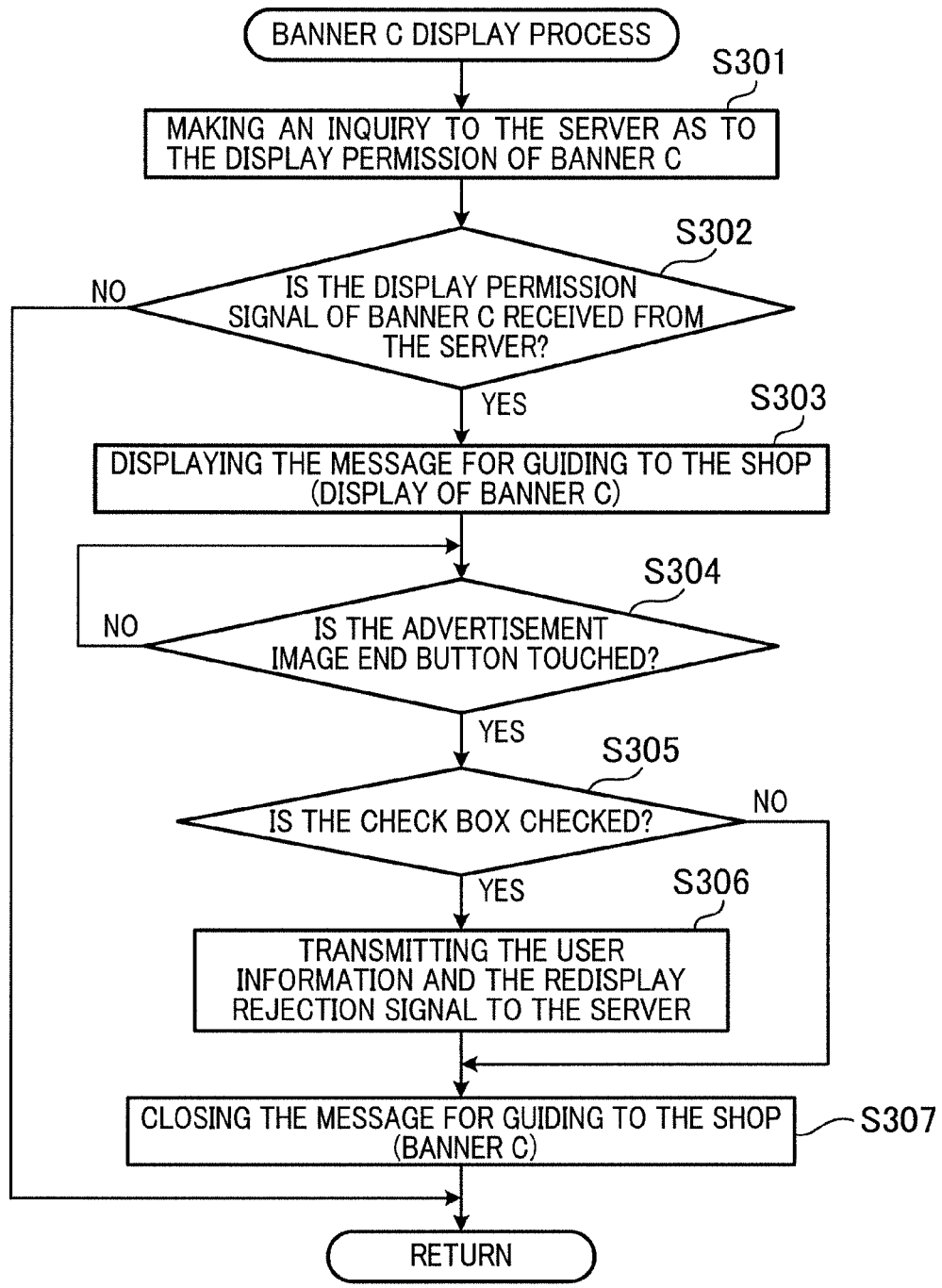
FIG. 15 is a diagram showing a flowchart of a banner C display process.

In this banner C display process, as shown in the flow of FIG. 15, first, the CPU 101 makes an inquiry to the server 200 as to whether or not to permit display of the advertisement image 321 of banner C (S301). Then, the CPU 101 determines whether or not a display permission signal of the banner C has been received from the server 200 (S302). If the display permission signal of the banner C is not received from the server 200 (S302: NO), the present process is terminated.

On the other hand, when the display permission signal of the banner C is received from the server 200 (S302: YES), based on the association data (the advertisement image display data of the notification information for guiding to the shop, the advertisement end input request image and the like, with reference to FIG. 8) corresponding to the advertisement image of the banner C transmitted together with the display permission signal of the banner C from the server 200, the advertisement end input request image 324 is displayed as shown in FIG. 22 (S303). According to the present embodiment, as shown in FIG. 22, in the advertisement end input request image 304, the advertisement image 321 of the banner C accompanied with the message "The number of possessed coins is small, do you want to go to the shop?", the advertisement image end button 322, and the check box 323 accompanied with the message "No display today" are displayed.

At that time, in the operation display area 24 of the display 120, the image of the shop button 246 blinks brightly and displayed. That is, the image of the shop button 246 that can shift to the shop where coins are available is highlighted and presented.

Next, the CPU 101 determines whether or not the advertisement image end button 322 has been selected (S304). When the advertisement image end button 322 is not selected (S304: NO), waiting for the selection of the advertisement image end button 322.

On the other hand, when the advertisement image end button 322 is selected (S304: YES), it is determined whether or not the check box 323 is checked (S305). When the check box 323 is checked (S305: YES), the CPU 101 transmits "user information and redisplay rejection signal" to the server 200 (S306).

In addition, receiving the "user identification information and redisplay rejection signal", the server 200 refers to the redisplay rejection data table shown in FIG. 9 and attaches the flag ("O" In FIG. 9) indicating the rejection of redisplay in the item of the advertisement image of the banner C corresponding to the user identification information associated with the sender smartphone 1, and the redisplay rejection data table is updated (with reference to the server process 1 in FIG. 17 which will be described later). For example, if the user identification information of the sender smartphone 1 is "user xx 1002", the flag ("O") indicating the rejection of redisplaying the advertisement image is attached to the item of the advertisement image of banner C, and thereafter, the redisplay rejection data table is updated.

After the process in S306 or when the check box 323 is not checked in S305 (S305: NO), the advertisement end input request image 324 is closed (S307). Thereafter, the present process is terminated.

After the banner C display process of S33, the process returns to the number of possessed coins check process, and the CPU 101 determines whether or not the image of the shop button 246 has been touched (S34). Then, when the image of the shop button 246 is touched (S34: YES), it is possible to access the server 200 from the smartphone 1 and move to the shop in which the credit (things that can be settled, such as cash, credit card, electronic money, prepaid card, or the like possessed by the user) can be exchanged for the coin.

Next, the CPU 101 determines whether or not there is an exchange from credit to coin in the shop (S35). Then, when there is the exchange from credit to coin (S35: YES), the number of coins exchanged is added to the value of the coin number counter provided in the flash memory 104 (S36). In this way, by touching the image of the shop button 246 to use the shop, communication with the server 200 managing the number of coins possessed by each user makes it possible to obtain coins, and if the coins are obtained, the value of the coin number counter stored in the flash memory 104 is updated.

After the process of S36, when the image of the shop button 246 is not touched by the process of S34 (S34: NO) or the process of S35 has not exchanged the credit into the coin (S35: NO), the CPU 101 determines whether or not the value of the coin number counter provided in the flash memory 104 is "0" (S37). Then, when the value of the coin number counter is "0" (S37: YES), a message indicating that the value of the coin number counter is "0" is displayed in the effect display area 23 of the display 120 (S38). That is, it is notified that the number of coins possessed by the user is "0". After the process of S38, the process shifts to the process of S34.

On the other hand, if the value of the coin number counter is not "0" in the process of S37 (S37: NO), the present process is terminated.

By performing the number of possessed coins checking process, when the number of coins possessed by the user due to the consumption of coins is less than 30% as compared with the number of coins possessed when logging into the slot game, a message informing that the coins can be acquired by going to the shop can be displayed.

After checking the number of coins possessed, the process returns to the main control process, and the CPU 101 performs a bet start check process to be described later (S15). In this process, an input check such as WAYS BET (WAYS BET 1, WAYS BET 2, WAYS BET 3, WAYS BET 4, WAYS BET 5) selected by the touch panel 5 or the like is performed. At this time, as shown in FIG. 4, according to the selection of WAYS BET, in order to distinguish from the area (black frame) which is not the object of the winning determination, the area which is the object of the winning determination in the symbol display area 21 is displayed in a white frame. In this way, it is possible to visually distinguish the area which is the object of the winning determination and the area which is not the object of the winning determination.

Next, the CPU 101 performs a symbol random determination process (S16). In this symbol random determination process, the symbol column of the video reels 3 shown in FIG. 6 is used to determine a to-be-stopped symbol by the random determination from a plurality of symbols arranged in each symbol column (REEL 1, REEL 2, REEL 3, REEL 4, REEL 5) of the video reels 3. The to-be-stopped symbol is data of five symbols of the plurality of symbols constituting each symbol column of the video reels 3 to be displayed in the respective middle rows of the first to fifth columns areas of the symbol display area 21. As a result, the 15 symbols displayed in the symbol display area 21 are determined.

For example, in the REEL 1 of the video reels 3, when a code number "21" is selected by the random determination from 26 symbols (code numbers "0" to "25") constituting the symbol column, the symbol of "CHERRY" corresponding to the code number "21" is determined as the to-be-stopped symbol. In addition, in the REEL 2, when a code number "10" is selected by the random determination from 29 symbols (code numbers "0" to "28") constituting the symbol column, the symbol of "9" corresponding to the code number "10" is determined as the to-be-stopped symbol. In addition, in the REEL 3, when a code number "8" is selected by the random determination from 28 symbols (code numbers "0" to "27") constituting the symbol column, the symbol of "CHERRY" corresponding to the code number "8" is determined as the to-be-stopped symbol. In addition, in the REEL 4, when a code number "7" is selected by the random determination from 27 symbols (code numbers "0" to "26") constituting the symbol column, the symbol of "J" corresponding to the code number "7" is determined as the to-be-stopped symbol. In addition, in the REEL 5, when a code number "6" is selected by the random determination from 34 symbols (code numbers "0" to "33") constituting the symbol column, the symbol of "Q" corresponding to the code number "6" is determined as the to-be-stopped symbol.

Then, the CPU 101 stores the five determined to-be-stopped symbols in the symbol storing area provided in the flash memory 104.

Next, the CPU 101 performs an effect contents determination process (S17). The CPU 101 extracts an effect-use random number and determines which one of a plurality of predetermined effect contents by the random determination.

Next, the CPU 101 performs a symbol display control process (S18). In the symbol display control process, the scrolling of each symbol column of the video reels 3 is started, and after a predetermined time, the five to-be-stopped symbols determined in the symbol random determination process in S16 are sequentially stopped respective middle rows of the first column area to the fifth column area of the symbol display area 21. That is, fifteen symbols including the to-be-stopped symbol are rearranged in the symbol display area 21. For example, as described above, in REEL 1, the symbol "CHERRY" is determined as a to-be-stopped symbol, in REEL 2, the symbol "9" is determined as a to-be-stopped symbol, in REEL 3, the symbol "CHERRY" is determined as a to-be-stopped symbol, in REEL 4, the symbol "J" is determined as a to-be-stopped symbol, and in REEL 5, the symbol "Q" is determined as a to-be-stopped symbol, and in this case, the "CHERRY", "9", "CHERRY", "J", and "Q" are respectively rearranged in respective middle rows of the first column area to the fifth column area of the symbol display area 21. In addition, symbols corresponding to preceding and succeeding code numbers of the to-be-stopped symbol are rearranged in the respective upper rows and the lower rows of the first to fifth columns areas of the symbol display region 21 (with reference to FIG. 19).

Next, the CPU 101 performs a payout amount determination process (S19). In this process, based on the symbol combination table of slot games (see FIG. 7) stored in the flash memory 104, it is determined whether symbols rearranged in the symbol display area 21 are connected up to the predetermined number from the first column area to the fifth column area in the area which is the object of the winning determination by the WAYS BET described above to establish a winning. Then, according to the winning, a benefit such as a payout is given. The given payout is stored in the payout amount storage area provided in the flash memory 104.

Figure 19:
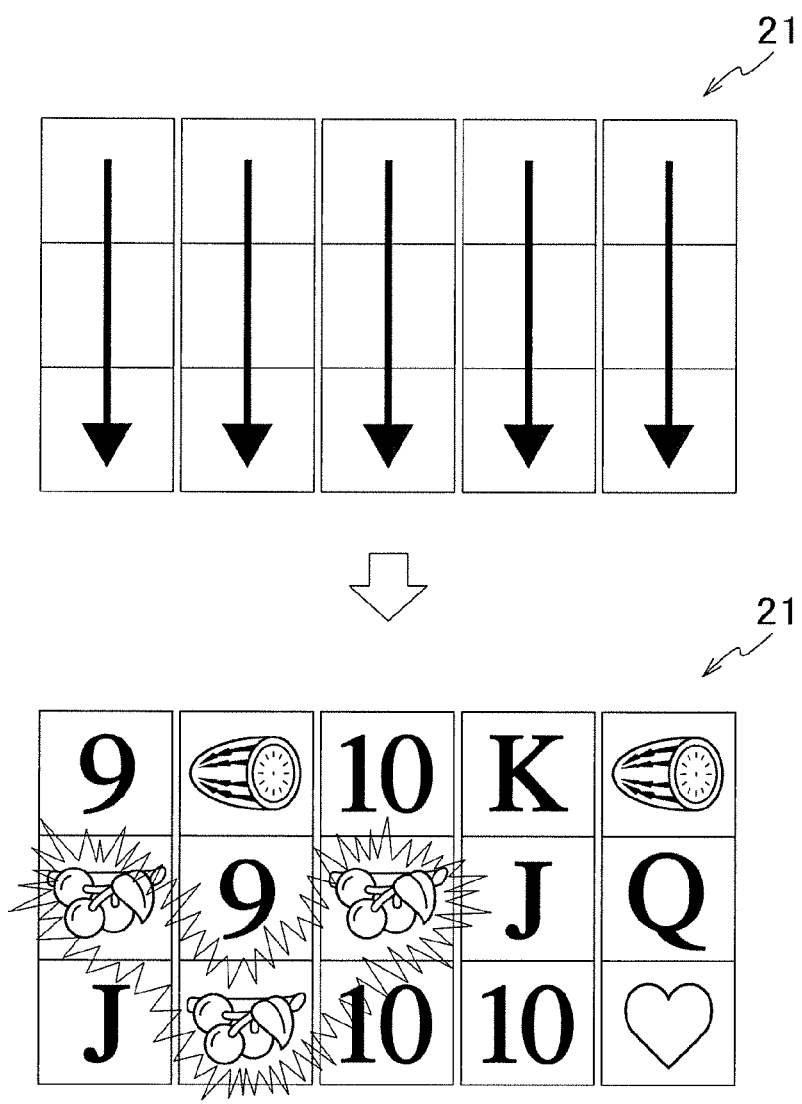
FIG. 19 is an illustrative view of a slot game displayed on a display.

For example, when "WAYS BET 3" is selected, the upper row, the middle row, and the lower row of the first column area, the upper row, the middle row and the lower row of the second column area, the upper row, the middle row and the lower row of the third column area, the middle row of the fourth column area, and the middle row of the fifth column area of the symbol display area 21 become the object of the winning determination (valid). Then, as shown in FIG. 19, when the symbols "CHERRY" are respectively stopped in the middle row of the first column area, the lower row of the second column area, and the middle row of the third columns area, the symbols "CHERRY" are consecutively connected up to three from the first column area to the third column area ("LEFT TO RIGHT") to establish one winning. At this time, in order to visually confirm that the winning of 3 Kind of "CHERRY" is established, as shown in FIG. 19, the three "CHERRY" symbols are blinked and displayed after glowing. Then, as the 3 Kind of "CHERRY", the symbol combination table of FIG. 7 is referred to, and coins of "15" are determined as a payout and stored in the payout amount storage area provided in the flash memory 104.

Next, the CPU 101 performs a payout process (S20). The CPU 101 adds the value stored in the payout amount storage area to the value of the coin number counter provided in the flash memory 104. For example, when "15" is stored in the payout amount storage area in the payout amount determination process of S19, "15" is added to the value of the coin number counter.

Next, the CPU 101 determines whether or not a winning of "7" (3 Kind of "7", 4 Kind of "7", 5 Kind of "7") is established (S21). Then, when the winning of "7" is established (S21: YES), the CPU 101 performs a free game process (S22). In this free game process, the user can perform the slot game for twenty times without consuming any coin.

On the other hand, if the winning of "7" is not established (S21: NO), or after the processing of S22, the CPU 101 performs a banner D display process (S23).

(Banner D Display Process)

Figure 16:
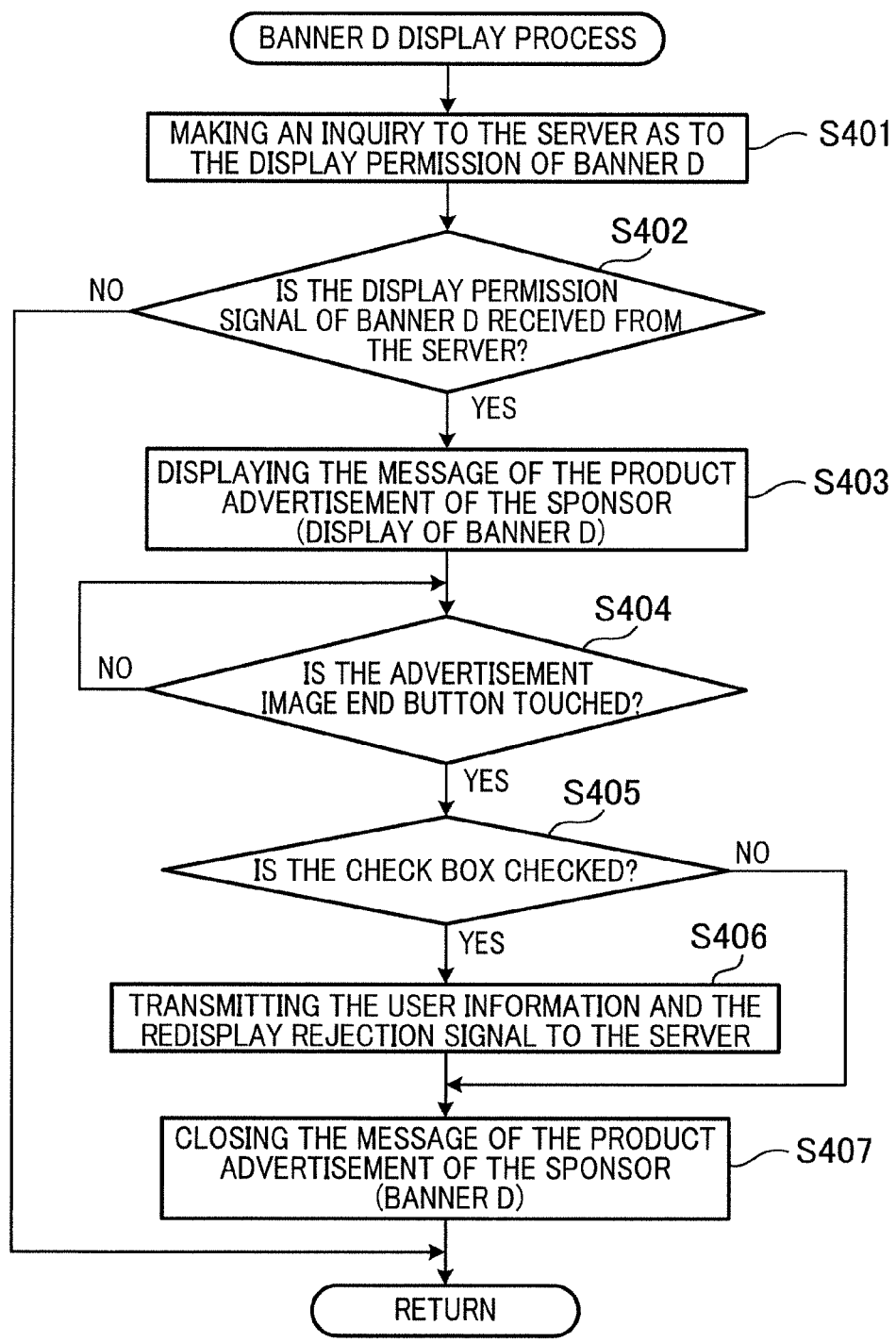
FIG. 16 is a diagram showing a flowchart of a banner D display process.

In this banner D display process, as shown in the flow of FIG. 16, first, the CPU 101 makes an inquiry to the server 200 as to whether or not to permit display of the advertisement image 331 of banner D (S401). Then, the CPU 101 determines whether or not a display permission signal of the banner D has been received from the server 200 (S402). If the display permission signal of the banner D is not received from the server 200 (S402: NO), the present process is terminated.

On the other hand, when the display permission signal of the banner D is received from the server 200 (S402: YES), based on the association data (the advertisement image display data of the information of the product advertisement of the sponsor, the advertisement end input request image and the like, with reference to FIG. 8) corresponding to the advertisement image of the banner D transmitted together with the display permission signal of the banner D from the server 200, the advertisement end input request image 334 is displayed as shown in FIG. 23 (S403). In the present embodiment, as shown in FIG. 23, in the advertisement end input request image 334, the advertisement image 331 of banner D accompanied with a message for a product provided by the sponsor as "product advertisement", the advertisement image end button 332, and the check box 333 accompanied with a message "No display today" are displayed.

Next, the CPU 101 determines whether or not the advertisement image end button 332 has been selected (S404). When the advertisement image end button 332 is not selected (S404: NO), waiting for the selection of the advertisement image end button 332.

On the other hand, when the advertisement image end button 332 is selected (S404: YES), it is determined whether or not the check box 333 is checked (S405). When the check box 333 is checked (S405: YES), the CPU 101 transmits "user information and redisplay rejection signal" to the server 200 (S406).

In addition, receiving the "user identification information and redisplay rejection signal", the server 200 refers to the redisplay rejection data table shown in FIG. 9 and attaches the flag ("0" In FIG. 9) indicating the rejection of redisplay in the item of the advertisement image of the banner D corresponding to the user identification information associated with the sender smartphone 1, and the redisplay rejection data table is updated (with reference to the server process 1 in FIG. 17 which will be described later). For example, if the user identification information of the sender smartphone 1 is "user xx 1003", the flag ("0") indicating the rejection of redisplaying the advertisement image is attached to the item of the advertisement image of banner D, and thereafter, the redisplay rejection data table is updated.

After the process in S406 or when the check box 333 is not checked in S405 (S405: NO), the advertisement end input request image 334 is closed (S407). Thereafter, the present process is terminated.

After the banner D display process in S23, the process returns to the main control process and shifts to the process in S13.

(Bet Start Check Process)

Figure 12:
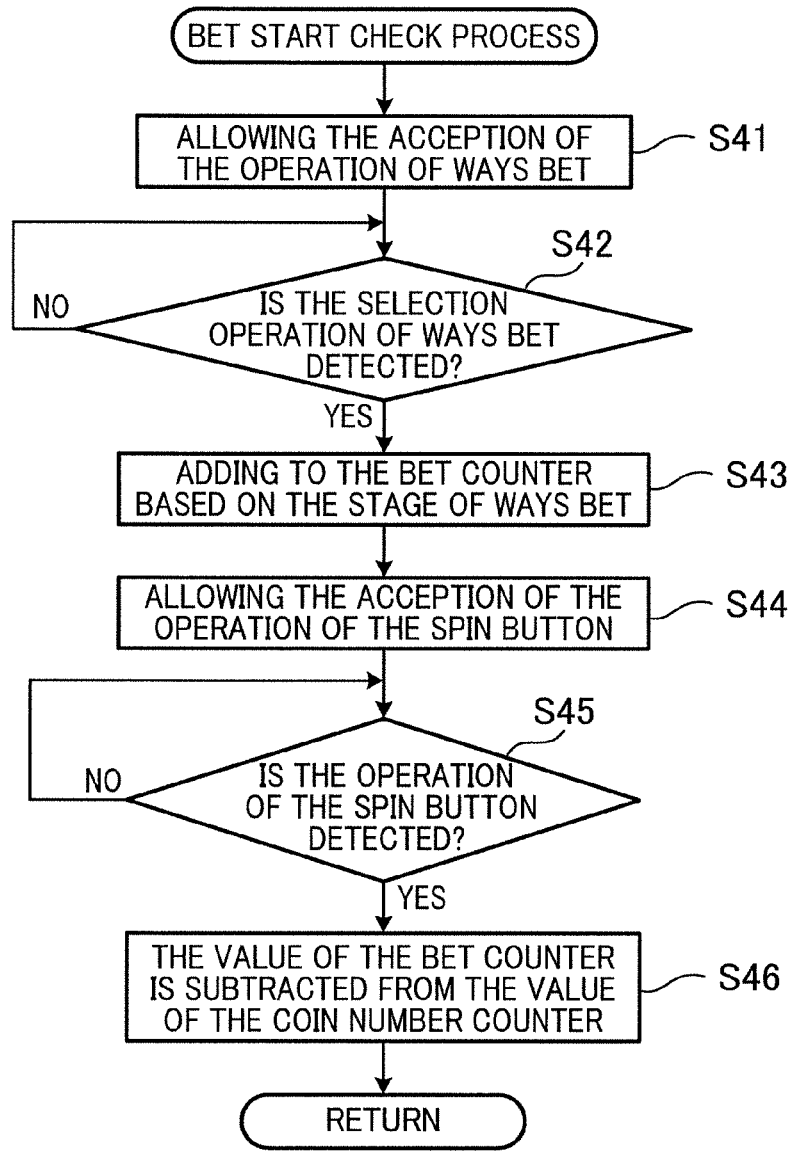
FIG. 12 is a diagram showing a flowchart of a bet start check process.

Next, with reference to FIG. 12, the bet start check process will be described.

First, the CPU 101 allows to accept the selection of the five stages of WAYS BET (WAYS BET 1, WAYS BET 2, WAYS BET 3, WAYS BET 4, WAYS BET 5) by pressing the touch panel 5 of the "+" button and the "−" button of the bet button 244 in the operation display area 24 (with reference to FIG. 1) (S41). The area as the object of the winning determination is determined from the 15 areas in 5 columns×3 rows of the symbol display area 21 by selecting five stages of the WAYS BET (with reference to FIG. 4).

Next, the CPU 101 determines whether or not a selection operation (pressing) of five stages of WAYS BET (WAYS BET 1, WAYS BET 2, WAYS BET 3, WAYS BET 4, WAYS BET 5) is detected (S42). If the selection operation of WAYS BET is not detected (S42: NO), waiting for the selection operation.

On the other hand, when the selection operation of five stages of WAYS BET (WAYS BET 1, WAYS BET 2, WAYS BET 3, WAYS BET 4, WAYS BET 5) is detected (S42: YES), the CPU 101 adds the value of coins necessary for WAYS BET (1 coin if it is WAYS BET 1, 3 coins if WAYS BET 2, 7 coins if WAYS BET 3, 15 coins if WAYS BET 4, 25 coins if WAYS BET 5) to the value of the bet counter provided in the flash memory 104 (S43).

Next, after process of S43, the CPU 101 allow the acceptance of operation of the spin button 241 (S44).

After S44, the CPU 101 determines whether or not the operation of the spin button 241 is detected (S45). When the CPU 101 determines that the operation of the spin button 241 is not detected (S45: NO), waiting for the operation of the spin button 241.

On the other hand, when it is determined that the operation of the spin button 241 is detected (S45: YES), the CPU 101 subtracts the value of the bet counter calculated in S43 from the value of the coin counter (S46). Thereafter, the bet start check process is terminated.

(Banner B Display Process)

Figure 14:
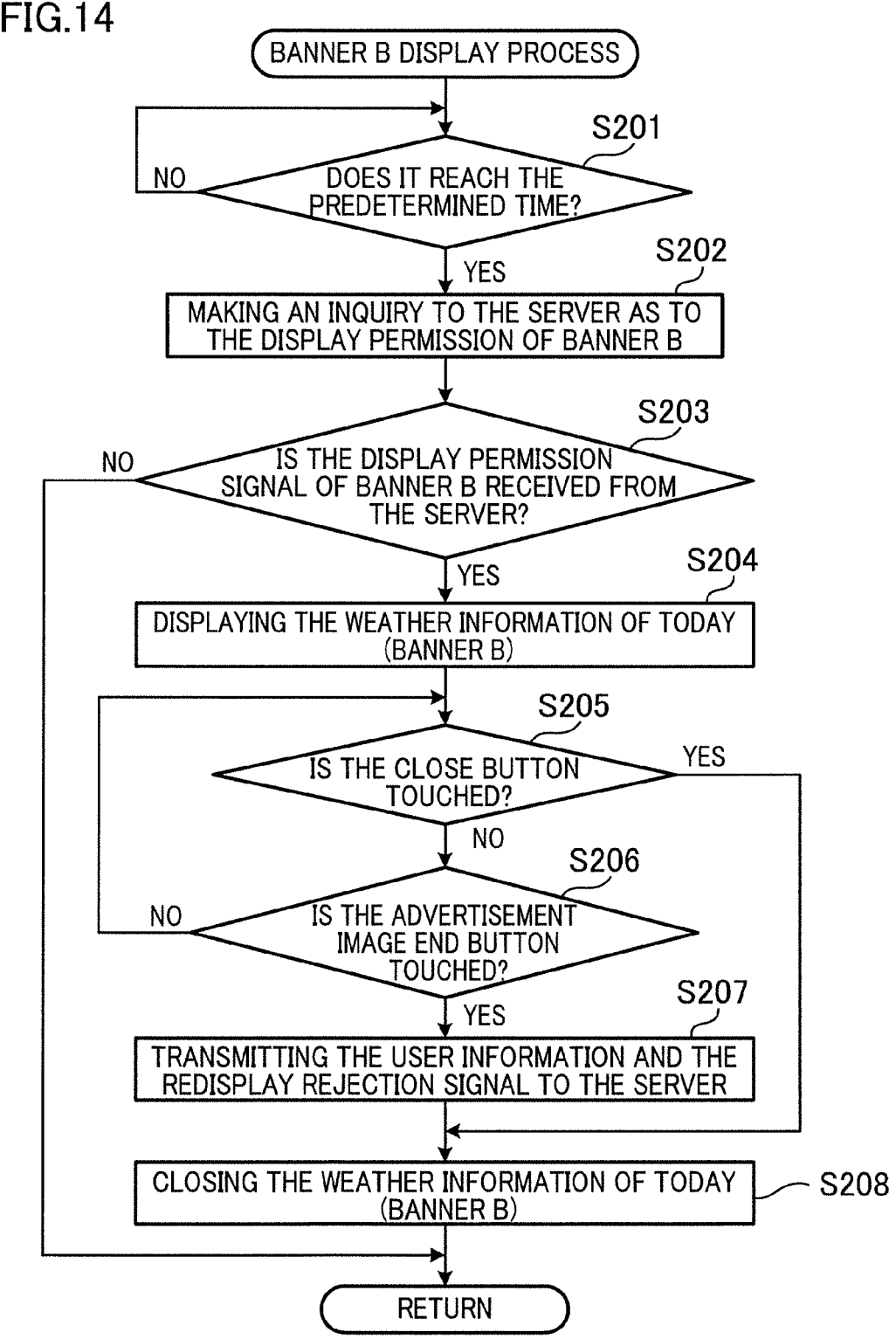
FIG. 14 is a diagram showing a flowchart of a banner B display process.

Next, with reference to FIG. 14, the banner B display process will be described. The banner B display process is a process performed in parallel with the main game control process of the slot game.

When the banner B display process is performed, the CPU 101 determines whether or not the current time has reached a predetermined time (for example, 6:00 am) (S201). Then, if the current time is not the predetermined time (S201: NO), the process waits for the predetermined time.

On the other hand, if the current time reaches the predetermined time (S201: YES), the CPU 101 makes an inquiry to the server 200 as to whether or not to permit display of the advertisement image 311 of the banner B (S202). Then, the CPU 101 determines whether or not a display permission signal of the banner B has been received from the server 200 (S203). If the display permission signal of the banner B is not received from the server 200 (S203: NO), the present process is terminated.

On the other hand, when the display permission signal of the banner B is received from the server 200 (S203: YES), based on the association data (the advertisement image display data of the display contents with respect to the weather, the advertisement end input request image and the like, with reference to FIG. 8) corresponding to the advertisement image of the banner B transmitted together with the display permission signal of the banner B from the server 200, the advertisement end input request image 314 is displayed as shown in FIG. 21 (S204). In the present embodiment, as shown in FIG. 21, in the advertisement end input request image 314, the advertisement image 311 of banner B concerning the weather information of "The weather in the afternoon of today is cloudy then sunny", the close button 312, and the advertisement image end button 313 accompanied by a message "No display today" are displayed.

Next, the CPU 101 determines whether or not the close button 312 is selected (S205). When the close button 312 is not selected (S205: NO), it is determined whether or not the advertisement image end button 313 is selected (S206). Then, if the advertisement image end button 313 is not selected (S206: NO), the process returns to S205.

On the other hand, when the advertisement image end button 313 is selected (S206: YES), the CPU 101 transmits "user information and redisplay rejection signal" to the server 200 (S207).

In addition, receiving the "user identification information and redisplay rejection signal", the server 200 refers to the redisplay rejection data table shown in FIG. 9 and attaches the flag ("0" In FIG. 9) indicating the rejection of redisplay in the item of the advertisement image of the banner B corresponding to the user identification information associated with the sender smartphone 1, and the redisplay rejection data table is updated (with reference to the server process 1 in FIG. 17 which will be described later). For example, if the user identification information of the sender smartphone 1 is "user xx 1003", the flag ("0") indicating the rejection of redisplaying the advertisement image is attached to the item of the advertisement image of banner B, and thereafter, the redisplay rejection data table is updated.

After the process in S207 or when the close button 312 is selected in the process of S205 (S205: YES), the advertisement end input request image 314 is closed (S208). Thereafter, the present process is terminated.

(Server Process 1)

Next, server process 1 performed by the server 200 will be described with reference to FIG. 17.

The server CPU 201 determines whether or not the "user identification information and redisplay rejection signal" transmitted from the smartphone 1 in the banner A display process, the banner B display process, the banner C display process, or the banner D display process described above is received (S501). Then, if the "user identification information and redisplay rejection signal" is not received (S501: NO), it is waited to receive the "user identification information and redisplay rejection signal".

On the other hand, when receiving the "user identification information and redisplay rejection signal" (S501: YES), the server CPU 201 refers to the redisplay rejection data table shown in FIG. 9 and attaches the flag ("0" In FIG. 9) indicating the rejection of redisplay in the item of the advertisement image of the banner to reject to redisplay corresponding to the user identification information associated with the sender smartphone 1, and the redisplay rejection data table is updated (S502). After completion of the process in S502, the present process is temporarily terminated and the present process is performed again.

(Server Process 2)

Figure 18:
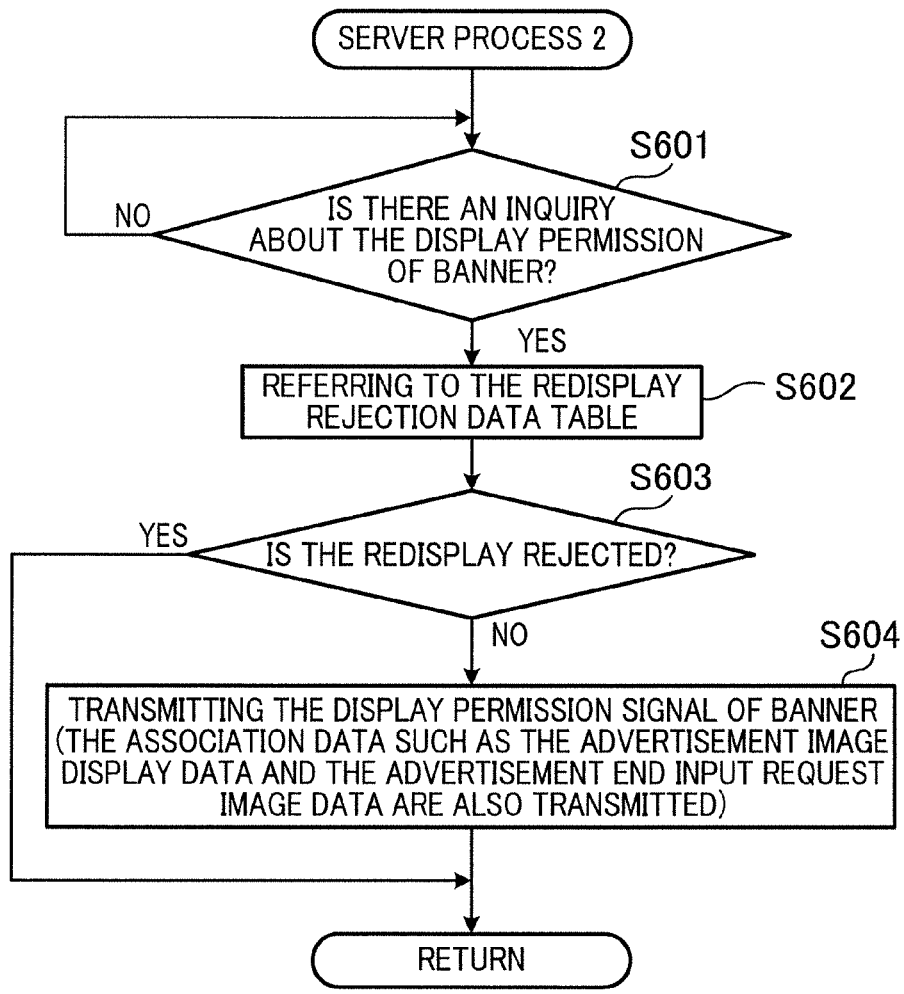
FIG. 18 is a diagram showing a flowchart of server process 2.

Next, server process 2 performed by the server 200 will be described with reference to FIG. 18.

In the banner A display process, the banner B display process, the banner C display process, or the banner D display process described above, the server CPU 201 determines whether or not there is an inquiry from the smartphone 1 as to whether or not to permit display of the advertisement image of the banner (S601). Then, if there is no inquiry (S601: NO), the inquiry is awaited.

On the other hand, if there is an inquiry (S601: YES), the redisplay rejection data table (with reference to FIG. 9) stored in the server storage device 204 is referred to (S602). Then, in the redisplay rejection data table referred to, the user identification information associated with the smartphone 1 as the inquiry source, and the item of the advertisement image of the banner inquired, it is determined whether or not the flag ("O") indicating the rejection of redisplay is attached (S603).

Then, if the flag ("O") indicating the rejection of redisplay is not attached (S603: NO), the association data corresponding to the advertisement image of the banner inquired and the display permission signal of the banner are transmitted to the smartphone 1 as the inquiry source (S604).

For example, when there is an inquiry as to whether or not to permit display of the advertisement image 301 of the banner A from the smartphone 1, association data corresponding to the advertisement image of the banner A together with the display permission signal of the banner A (the advertisement image display data (message displayed on the advertisement image 301, etc.) of the display contents with respect to the notification of the event, the advertisement end input request image 304, etc.: with reference to FIG. 8) is transmitted to the smartphone 1 as the inquiry source.

On the other hand, when the flag ("O") indicating the rejection of redisplay is attached (S603: YES), the display permission signal of the banner is not transmitted to the smartphone 1 as the inquiry source. Thereafter, the present process is temporarily terminated and the present process is performed again.

According to the above configuration, the server 200 transmits to the smartphone 1 the advertisement end input request image 324 (with reference to FIG. 22) including the check box 323 and the advertisement image end button 322 and the advertisement end input request image 304 (with reference to FIG. 20) including the advertisement image end button 303 in accordance with the four advertisement images (the banner A, the banner B, the banner C, and the banner D). Thereby, it is possible to set that the advertisement image of the banner can be prevented from being redisplayed in one action and the advertisement image can be prevented from being redisplayed in two actions in accordance with the four advertisement images (the banner A, the banner B, the banner C, and the banner D). Therefore, if it is the banner A or banner B with a low degree of importance to the administrator, it can be set to end with one action, thereby improving the convenience of the input operation by the user. On the other hand, if it is the banner C or banner D having a high degree of importance to the administrator, it can be set to end with two actions, so that it is possible to prompt the user's attention to the important banner as compared with the case of one action.

Second Embodiment

In the above embodiment, the case where the association data is stored in the server storage device 204 of the server 200 has been described. However, according to the present invention, in the configuration not using the server 200, the association data and the redisplay rejection data table (note that as for the user identification information, the smartphone 1 stores only its own user identification information for its own) may be stored in the flash memory 104 of the smartphone 1.

Figure 24:
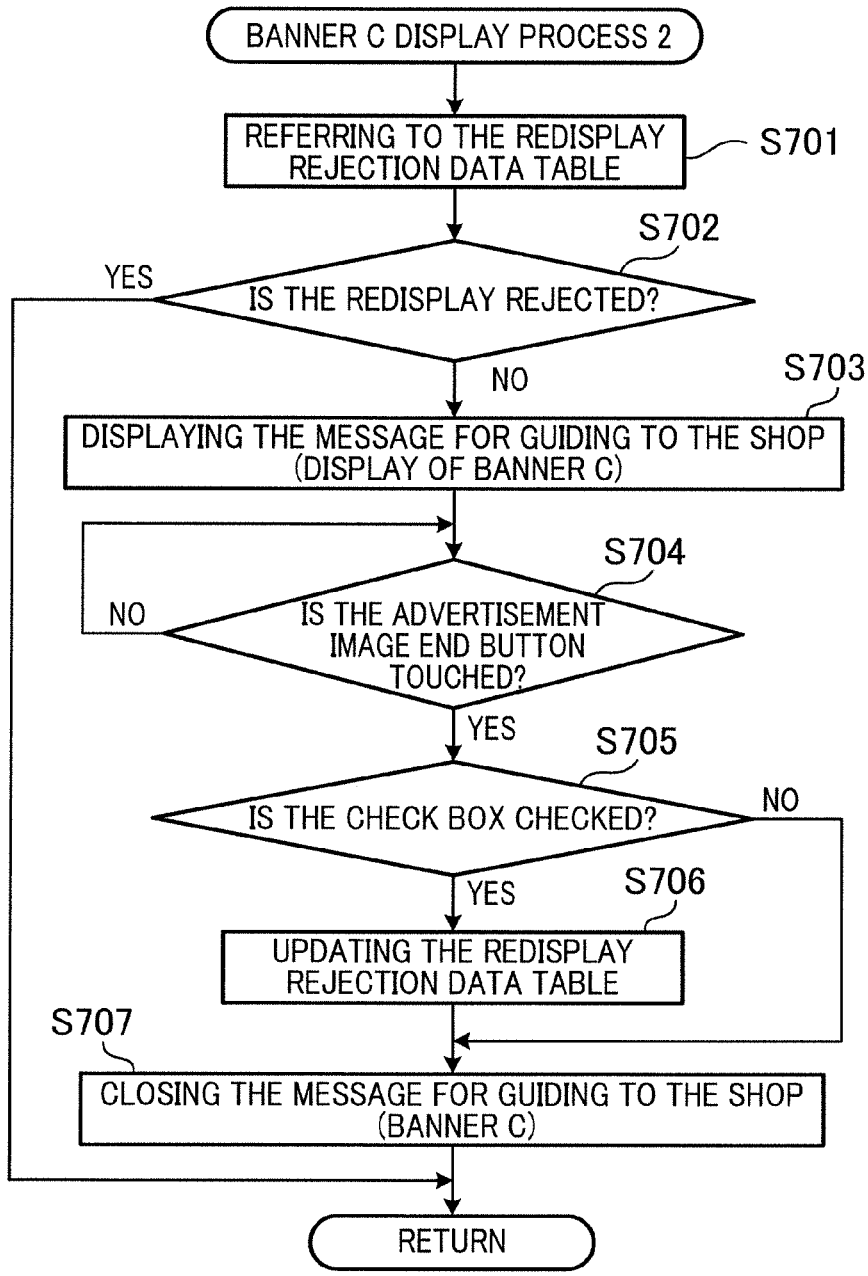
FIG. 24 is a diagram showing a flowchart of the banner C display process 2 of further embodiment.

In this case, for example, in the case of the banner C display process, the CPU 101 performs the banner C display process 2 shown in FIG. 24 instead of the banner C display process (S33) of the number of possessed coins check process (S14).

In the banner C display process 2, as shown in the flow of FIG. 24, first, the CPU 101 refers to the redisplay rejection data table (FIG. 9) stored in the flash memory 104 (S701). Then, in the redisplay rejection table referred to, it is determined whether or not the flag ("O") indicating the rejection of redisplay is attached to the item of advertisement image of the banner (S702). Then, if the flag ("O") indicating the rejection of redisplay is attached (S702: YES), the present process is terminated.

On the other hand, when the flag ("O") indicating the rejection of redisplay is not attached (S702: NO), based on the association data (the advertisement image display data of the notification information for guiding to the shop and the advertisement end input request image, etc.: with reference to FIG. 8) corresponding to the advertisement image of the banner C stored in the flash memory 104, the advertisement end input request image 324 is displayed as shown in FIG. 22 (S703). According to the present embodiment, as shown in FIG. 22, in the advertisement end input request image 304, the advertisement image 321 of the banner C accompanied with the message "the number of possessed coins is small, do you want to go to the shop?", the advertisement image end button 322, and the check box 323 accompanied with the message "No display today" are displayed.

At that time, in the operation display area 24 of the display 120, the image of the shop button 246 blinks brightly and displayed. That is, the image of the shop button 246 that can shift to the shop where coins are available is highlighted and presented.

Next, the CPU 101 determines whether or not the advertisement image end button 322 has been selected (S704). When the advertisement image end button 322 is not selected (S704: NO), waiting for the selection of the advertisement image end button 322.

On the other hand, when the advertisement image end button 322 is selected (S704: YES), it is determined whether or not the check box 323 is checked (S705). When the check box 323 is checked (S705: YES), the CPU 101 refers to the redisplay rejection data table shown in FIG. 9, and the flag ("O" in the figure) indicating the rejection of redisplay is attached to the item of the advertisement image of banner C to update the redisplay rejection data table (S706).

After the process in S706 or when the check box 323 is not checked in S705 (S705: NO), the advertisement end input request image 324 is closed (S707). Thereafter, the present process is terminated.

In the above description, the banner C display process has been exemplified, but the banner A display process, the banner B display process, and the banner D display process can be similarly changed.

Although the embodiment of the present invention has been described above, it is merely a specific example, and the present invention is not particularly limited, and the specific configuration of each means and the like can be appropriately designed and changed. In addition, the effects described in the embodiments of the present invention are merely a list of the most preferable effects produced by the present invention, and the effects of the present invention are not limited to those described in the embodiments of the present invention.

What is claimed is:

1. A server communicably connected to an information processor having a display capable of displaying an image, the server comprising:
   a storage unit for storing:
      a plurality of image data,
      a first end input request image data including a redisplay button for setting whether to display the image on the information processor again at a periodically repeating predetermined time or not and a first close button for ending the display of the image,
      a second end input request image data including a second close button for ending the display of the image without redisplaying the image at the periodically repeating predetermined time, and
      association data in which one of the first end input request image data and the second end input request image data is stored in association with the types of the plurality of image data, and
   a controller configured to:
      determine, based on the association data, that an image data of the plurality of image data is associated with the first end input request image data;
      cause display of the image data with the first end input request image data;
      receive input that the first close button has been selected along with the redisplay button;
      when the first close button has been selected, cause the information processor to end the display of the image data;
      when the redisplay button has been selected, transmit user information and a redisplay rejection signal to the storage unit, update the storage unit with the user information and the redisplay rejection signal, and, at the periodically repeating predetermined time, cause the information processor to prevent the display of the image data again.

2. The server of claim 1, wherein, the first end input request image data is stored in association with a banner advertisement for guiding to pay.

3. The server of claim 1, wherein, the controller further includes a changing unit that changes the association between the image data and the first end input request image data or a second end input request image data based on the association data by an administrator side.

4. The server of claim 1, wherein the controller is further configured to:
   execute a game;
   after ending display of the image data, resume executing the game.

5. An information processor comprising an input device for accepting input and a display for displaying an image, the information processor comprising:
   a storage unit for storing data, the data including:
      a plurality of image data,
      a first end input request image data including a redisplay button for setting whether to display the image on the information processor again at a periodically repeating predetermined time or not and a close button for ending the display of the image,
      a second end input request image data including a second close button for ending the display of the image without redisplaying the image at the periodically repeating predetermined time, and
      association data in which one of the first end input request image data and the second end input request image data is stored in association with the types of the plurality of image data,
   a controller configured to execute the following process using the data stored in the storage unit:
      display an image data with the first end input request image data;
      receive input to select the redisplay button;
      receive input to select the first close button;
      when the first close button has been selected, end display of the image data;
      as the redisplay button is selected along with the first close button, transmit user information and a redisplay rejection signal to the storage unit, and, at the periodically repeating predetermined time, inquire to the storage unit whether to display the image data again and based on a response from the storage unit, prevent display of the image data again.

6. The information processor of claim 5, wherein the controller is further configured to:
   execute a game;
   after ending display of the image data, resume executing the game.

7. A system comprising:
   an information processor which consumes a gaming medium from a user, executes a game in response to consumption of the gaming medium, and includes a display operable to display an image of the game; and
   a server communicably connected to the information processor, the server storing image data for guiding the user to a screen on which a credit can be exchanged for the gaming medium,
   the information processor displaying along with the image data with a first end request image,
   the first end request image includes a redisplay setting input and a close input,
   wherein when the redisplay setting input is selected along with the close input, the information processor transmits user information and a redisplay rejection signal to a storage unit, and, at the periodically predetermined time, the information processor inquires to the storage unit whether to display the image again and based on a response from the storage unit, the image is prevented from being displayed on the information processor again,
   wherein the periodically repeating predetermined time is determined based on a process of checking a number of gaming media possessed by the user.

8. The system of claim 7, wherein the information processor displays the number of gaming media possessed by the user.

9. The system of claim 7, wherein the gaming medium includes coinage, a value of a coin counter is updated when a coin is received.

* * * * *